United States Patent
Oohara et al.

(10) Patent No.: US 6,762,212 B2
(45) Date of Patent: *Jul. 13, 2004

(54) EXTRUDED STYRENE RESIN FOAMS AND METHODS FOR PRODUCING THE SAME

(75) Inventors: Youichi Oohara, Hyogo (JP); Fuminobu Hirose, Osaka (JP); Takeshi Sato, Osaka (JP); Hiroshi Fujiwara, Osaka (JP); Toru Yoshida, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/358,153

(22) Filed: Feb. 5, 2003

(65) Prior Publication Data

US 2003/0191203 A1 Oct. 9, 2003

Related U.S. Application Data

(62) Division of application No. 09/868,637, filed as application No. PCT/JP00/07489 on Oct. 26, 2000, now Pat. No. 6,569,912.

(30) Foreign Application Priority Data

| Oct. 27, 1999 | (JP) | 11-305771 |
|---|---|---|
| Nov. 4, 1999 | (JP) | 11-314263 |
| Nov. 8, 1999 | (JP) | 11-317419 |
| Nov. 9, 1999 | (JP) | 11-318796 |
| May 8, 2000 | (JP) | 2000-135024 |
| May 12, 2000 | (JP) | 2000-140871 |
| May 12, 2000 | (JP) | 2000-140872 |

(51) Int. Cl.$^7$ ................................................ C08J 9/08
(52) U.S. Cl. .................... 521/146; 521/85; 521/90; 521/94; 521/95; 521/79
(58) Field of Search .................. 521/146, 79, 85, 521/90, 94, 95

(56) References Cited

U.S. PATENT DOCUMENTS

| 3,919,365 A | 11/1975 | Boyer |
| 3,980,616 A | 9/1976 | Kimura et al. |
| 4,182,799 A | 1/1980 | Rodish |
| 5,064,874 A | 11/1991 | Motani et al. |
| 5,453,454 A | 9/1995 | Alicke et al. |
| 5,470,888 A | 11/1995 | Vonken et al. |

FOREIGN PATENT DOCUMENTS

| EP | 0 027 556 | 4/1981 |
| EP | 0 223 539 | 5/1987 |
| EP | 0 317 849 | 5/1989 |
| JP | 50-105744 | 8/1975 |
| JP | 3-124744 | 5/1991 |
| JP | 4-307228 | 10/1992 |
| JP | 5-295274 | 11/1993 |
| JP | 8-113671 | 5/1996 |
| JP | 10-237210 | 9/1998 |
| JP | 11-158317 | 6/1999 |
| WO | WO 99/33625 | 7/1999 |
| WO | WO 99/54390 | 10/1999 |
| WO | WO 00/12593 | 3/2000 |
| WO | WO 01/51551 A1 | 7/2001 |

*Primary Examiner*—Morton Foelak
(74) *Attorney, Agent, or Firm*—Westerman, Hattori, Daniels & Adrian, LLP

(57) ABSTRACT

An extruded styrene resin foam obtained by extrusion-foaming of a styrene resin and excellent in environmental compatibility and excellent in flame retardant property and thermal insulating property, characterized in that it contains, as a blowing agent, 100 to 10% by weight of at least one of saturated hydrocarbons having 3 to 5 carbons and 0 to 90% by weight of other blowing agent, based on the total amount of the blowing agent, and contains (A) a halogenated flame retardant and (B) at least one compound selected from the group consisting of phosphorus type flame retardants containing nitrogen atom in a molecule, tetrazole compounds, cyanuric acid and derivatives thereof, isocyanuric acid and derivatives thereof, metal borates, and boron oxides.

7 Claims, No Drawings

EXTRUDED STYRENE RESIN FOAMS AND METHODS FOR PRODUCING THE SAME

This application is a divisional of prior application Ser. No. 09/868,637, filed Jun. 27, 2001, now U.S. Pat. No. 6,569,912, which is a 371 of PCT/UP00/07489 filed Oct. 26, 2000.

TECHNICAL FIELD

The present invention relates to an extruded styrene resin foam excellent in environmental compatibility, thermal insulating property and flame retardant property and a method for producing the same.

BACKGROUND ART

A method for continuously producing a foam wherein a styrene resin is heated and melted by means of an extruder or the like, a blowing agent is added thereto, and the resultant mixture is cooled and extruded to a low pressure region is already known (for example, JP-B-31-5393 and JP-B-42-19195) and a method using a flon as a blowing agent is also known (for example, JP-B-41-672 and JP-B-57-7175).

However, from the viewpoint of ozone layer protection, it has been desired to replace flons with others if possible.

As an extruded styrene resin foam using a blowing agent other than flons and a method for producing the foam, JP-A-10-237210 discloses an extruded styrene resin foam and a method for producing the foam by using propane, butane or a mixture thereof, or a mixture of these hydrocarbons with methyl chloride, ethyl chloride or a mixture thereof as a blowing agent. Further, the same publication discloses that hexabromocyclododecane or tetrabromobisphenol A is added in an amount of 1 to 3% by weight to a styrene resin and the amounts of blowing agents remaining in the resultant foam are adjusted to not more than 3.5% by weight for propane and to not more than 2.0% by weight for butane so as to meet the flame retardant property prescribed in JIS A 9511.

Further, JP-A-7-53761 discloses a method for producing a polystyrene foam with a relatively thin thickness and flame retardant property using a blowing agent such as propane, butane or a mixture thereof, and a shaped article thereof. The same publication also discloses that the flame retardant property is developed after a long storage period from 1 to 13 weeks and that haloalkylaryl phosphate, ammonium polyphosphate, hexabromocyclododecane, or magnesium hydroxide is used as a flame retardant.

However, in the case of the foam obtained according to the invention disclosed in the above-mentioned JP-A-10-237210 wherein no flon is used, in order to adjust the remaining gas amount of propane or butane to the level as described above, there are problems such as that it is required to limit the amount of propane or butane added in producing a foam and that it is required to subject the obtained foam to a long time storage until the blowing agent is decreased after the production of the foam, which problems result in poor production stability in extrusion foaming and poor productivity.

Further, with the amount of propane or butane in a foam using no flon obtained by the foregoing invention, it is difficult to obtain a foam having high-level thermal insulating property, for example, as required for thermal insulating board No. 3 of extruded polystyrene foam prescribed in JIS A 9511. According to the investigation carried out by the present inventors, in order to obtain a foam having high-level thermal insulating property, it is preferable to allow a saturated hydrocarbon such as propane, butane or the like to remain in a larger amount. For example, though depending upon the foam density, it is supposed that propane is preferable to remain 4% by weight or more and butane is preferable to remain 2.5% by weight or more, especially 3% by weight or more in the case of a foam density within a range of 20 to 35 $kg/m^3$. However, in the case where compounds with relatively high flammability such as aliphatic hydrocarbons represented by propane, butane and the like are allowed to remain in large amounts, sometimes the flame retardant property prescribed in JIS A 9511 cannot be satisfied only by using 1 to 3% by weight of hexabromocyclododecane or tetrabromobisphenol A as disclosed in the foregoing invention. In this case, it may be proposed to increase the amount of a flame retardant to be added in order to improve the flame retardant property. However, stable flame retardant property is not easy to obtain only by increasing the amount of a flame retardant. Especially, although the styrene resin, which is a base material of a foam, itself is made flame-retardant, the hydrocarbons evaporated from the foam upon burning are easy to be ignited and hence the problem that suppression of burning tends to be difficult has still been left unsolved. Further, increase in the amount of the flame retardant is likely to lead to deterioration of the formability of the foam and it tends to be difficult to obtain a form product with a satisfactory quality.

Also, in the case of the invention disclosed in the above described JP-A-7-53761, the obtained foam is required to store for a relatively long period and increase of storage cost may be a matter. Further, the invention does not disclose the necessary technique regarding the amount of a blowing agent to be injected to an extruder, the proper amount of a flame retardant to be used and the like, resulting in great difficulty in commercial practice. Moreover, in the working examples of the invention, it is shown that the desired flame retardant property can not be achieved in the case of using a blowing agent composed of 100% by weight of butane or a mixture of butane/propane in 80/20 weight ratio.

As described above, it is extremely difficult to achieve both of high-level thermal insulating property and high-level flame retardant property in the system using saturated hydrocarbons as blowing agents.

In view of such a situation, an object of the present invention is to provide a styrene resin foam having high-level thermal insulating property and at the same time high-level flame retardant property sufficient to meet the flame retardant property prescribed in JIS A 9511 using a blowing agent having a tendency to be highly combustible and to provide a method for producing the foam.

DISCLOSURE OF THE INVENTION

The present inventors have intensively made investigation to solve the above described problems and consequently found that excellent flame retardant property can be achieved by using (A) a halogenated flame retardant and (B) one or more of compounds selected from the group consisting of phosphorus type flame retardants containing nitrogen atom in a molecule, tetrazole compounds, nitrogen-containing compounds having the following general formula 1, nitrogen-containing compounds having the following general formula 2, metal borates, and boron oxides for a styrene resin foam using a hydrocarbon as a blowing agent, in spite of use of a hydrocarbon as a blowing agent, and especially that ignition or combustion of the hydrocarbon evaporated from the foam on burning can be suppressed. More particularly, it has been found that both high-level flame retardant property and high-level thermal insulating property as prescribed in JIS A 9511 can be achieved. Moreover, it has been found that the effect of suppressing the combustion of the hydrocarbon can be further enhanced by using a phosphoric acid ester compound in combination with the foregoing components. It has been also found that the thermal insulating property can be further improved by forming a foam with a specified cell structure by using water as a blowing agent in combination and adding a water absorptive substance such as bentonite together.

That is, the present invention provides the following extruded styrene resin foams and their production methods.

(1) An extruded styrene resin foam obtained by extrusion-foaming of a styrene resin, which contains, as a blowing agent, 100 to 10% by weight of at least one of saturated hydrocarbons having 3 to 5 carbon atoms and 0 to 90% by weight of other blowing agent, based on the total amount of the blowing agent, and contains (A) a halogenated flame retardant and (B) at least one compound selected from the group consisting of phosphorus type flame retardants containing nitrogen atom in a molecule, tetrazole compounds, nitrogen-containing compounds having the following general formula 1, nitrogen-containing compounds having the following general formula 2, metal borates, and boron oxides:

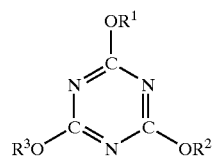

wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, or a phenyl group), and a phenyl group, and may be different from each other.

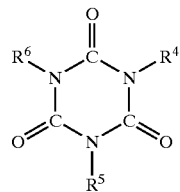

wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, or a phenyl group), and a phenyl group, and may be different from each other.

(2) The extruded styrene resin foam as described in (1), wherein the total content of the saturated hydrocarbon having 3 to 5 carbon atoms in the extruded styrene resin foam is 2 to 10 parts by weight based on 100 parts by weight of the foam.

(3) The extruded styrene resin foam as described in (1) or (2), wherein the extruded styrene resin foam contains 0.1 to 10 parts by weight of the halogenated flame retardant (A) and 0.1 to 10 parts by weight in total of the compound (B), based on 100 parts by weight of the styrene resin.

(4) The extruded styrene resin foam as described in any one of (1) to (3), wherein the saturated hydrocarbon having 3 to 5 carbon atoms is at least one saturated hydrocarbon selected from the group consisting of propane, n-butane, and isobutane.

(5) The extruded styrene resin foam as described in any one of (1) to (4), wherein other blowing agent is at least one compound selected from the group consisting of dimethyl ether, diethyl ether, methyl ethyl ether, methyl chloride, ethyl chloride, water, and carbon dioxide.

(6) The extruded styrene resin foam as described in any one of (1) to (5), wherein the halogenated flame retardant (A) is hexabromocyclododecane.

(7) The extruded styrene resin foam as described in any one of (1) to (6), wherein the compound (B) is a phosphorus type flame retardant containing nitrogen atom in a molecule.

(8) The extruded styrene resin foam as described in (7), wherein the compound (B) is a phosphorus type flame retardant containing nitrogen atom in a molecule and the thickness of the foam is 15 mm or more.

(9) The extruded styrene resin foam as described in (7) or (8), wherein the phosphorus type flame retardant containing nitrogen atom in a molecule is ammonium phosphate and/or ammonium polyphosphate.

(10) The extruded styrene resin foam as described in any one of (1) to (6), wherein the compound (B) is a tetrazole compound.

(11) The extruded styrene resin foam as described in (10), wherein the tetrazole compound is a tetrazole compound having a thermal decomposition temperature of 250° C. or higher.

(12) The extruded styrene resin foam as described in any one of (1) to (6), wherein the compound (B) is at least one compound selected from the group consisting of nitrogen-containing compounds having the foregoing general formula 1 and nitrogen-containing compounds having the forgoing general formula 2.

(13) The extruded styrene resin foam as described in any one of (1) to (6), wherein the compound (B) is a nitrogen-containing compound having the forgoing general formula 2.

(14) The extruded styrene resin foam as, described in (13), wherein the nitrogen-containing compound having the forgoing general formula 2 is isocyanuric acid and/or bis(2-carboxyethyl) isocyanurate.

(15) The extruded styrene resin foam as described in any one of (1) to (6), wherein the compound (B) is a metal borate.

(16) The extruded styrene resin foam as described in (15), wherein the compound (B) is a metal borate and a fatty acid metal salt is further contained.

(17) The extruded styrene resin foam as described in (15) or (16), wherein the metal borate is zinc borate.

(18) The extruded styrene resin, foam as described in any one of (1) to (6), wherein the compound (B) is a boron oxide.

(19) The extruded styrene resin foam as described in (18), wherein the boron oxide is a boron oxide surface-treated with a surface treating agent.

(20) The extruded styrene resin foam as described in (18) or (19), wherein the boron oxide is diboron trioxide.

(21) The extruded styrene resin foam as described in (19), wherein the surface treating agent comprises a thermosetting resin as a main component.

(22) The extruded styrene resin foam as described in any one of (1) to (21), which further contains 0.1 to 10 parts by weight of a phosphoric acid ester compound based on 100 parts by weight of the styrene resin.

(23) The extruded styrene resin foam as described in any one of (1) to (6), wherein the compound (B) is at least one compound selected from the group consisting of tetrazole compounds, nitrogen-containing compounds having the foregoing formula 1, nitrogen-containing compounds having the foregoing formula 2 and boron oxides surface-treated with a surface treating agent, and a montmorillonite type mineral is further contained.

(24) The extruded styrene resin foam as described in any one of (1) to (6), wherein the compound (B) is at least one compound selected from the group consisting of tetrazole compounds, nitrogen-containing compounds having the foregoing described formula 1, nitrogen-containing compounds having the foregoing formula 2 and boron oxides surface-treated with a surface treating agent, and a montmorillonite type mineral and a phosphoric acid ester compound are further contained.

(25) The extruded styrene resin foam as described in (23) or (24), wherein the montmorillonite type mineral is bentonite.

(26) The extruded styrene resin foam as described in any one of (23) to (25), wherein the compound (B) is isocyanuric acid and/or bis(2-carboxyethyl) isocyanurate.

(27) An extruded styrene resin foam containing no flon type blowing agent and having both thermal insulating property and flame retardant property meeting thermal insulating board No.3 of extruded polystyrene foam prescribed in JIS A 9511.

(28) The extruded styrene resin foam as described in (27), wherein the thermal insulating property is 0.028 W/mK or lower in terms of thermal conductivity.

(29) The extruded styrene resin foam as described in (27) or (28), wherein the flame retardant property meets the requirements that the flame is extinguished within 3 seconds and neither remaining ember nor spreading flame beyond the indicating line of combustion limit exists in the combustion test prescribed in JIS A 9511.

(30) A method for producing an extruded styrene resin foam comprising the steps of heating and melting a styrene resin, adding a blowing agent to the styrene resin, and extrusion-foaming the resultant through a die, wherein the extrusion-foaming is carried out in a condition where (A) a halogenated flame retardant and (B) at least one compound selected from the group consisting of phosphorus type flame retardants containing nitrogen atom in a molecule, tetrazole compounds, nitrogen-containing compounds having the following general formula 1, nitrogen-containing compounds having the following general formula 2, metal borates, and boron oxides, and further a blowing agent comprising 100 to 10% by weight of at least one of saturated hydrocarbons having 3 to 5 carbon atoms and 0 to 90% by weight of other blowing agent, based on the total amount of the blowing agent, are made coexist in the styrene resin:

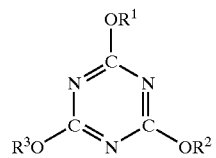

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, or a phenyl group), and a phenyl group, and may be different from each other.

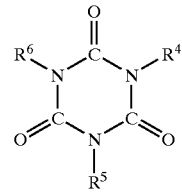

2 wherein $R^4$, $R_5$ and $R_6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, or a phenyl group), and a phenyl group, and may be different from each other.

(31) The method for producing an extruded styrene resin foam as described in (30), wherein the extrusion foaming is carried out further in the presence of a montmorillonite type mineral and/or a phosphoric acid ester compound.

(32) The method for producing an extruded styrene resin foam as described in (30) or (31), wherein the compound (B) is a phosphorus type flame retardant containing nitrogen atom in a molecule and the blowing agent comprises 70 to 30% by weight of at least one of saturated hydrocarbons having 3 to 5 carbon atoms and 30 to 70% by weight of at least one ether selected from the group consisting of dimethyl ether, diethyl ether, and methyl ethyl ether, based on the total amount of the blowing agent.

(33) The method for producing an extruded styrene resin foam as described in (30) or (31), wherein the compound (B) is a metal borate and the extrusion foaming is carried out further in the presence of a fatty acid metal salt.

(34) The method for producing an extruded styrene resin foam as described in (33), wherein the blowing agent comprises 90 to 10% by weight of at least one of saturated hydrocarbons having 3 to 5 carbon atoms and 10 to 90% by weight of at least one ether selected from dimethyl ether, diethyl ether, and methyl ethyl ether, based on the total amount of the blowing agent.

(35) The method for producing an extruded styrene resin foam as described in (30) or (31), wherein the compound (B) is a tetrazole compound and the blowing agent comprises 90 to 10% by weight of at least one of saturated hydrocarbons having 3 to 5 carbon atoms and 10 to 90% by weight of at least one ether selected from the group consisting of dimethyl ether, diethyl ether, and methyl ethyl ether, based on the total amount of the blowing agent.

(36) The method for producing an extruded styrene resin foam as described in (30) or (31), wherein the compound (B) is a nitrogen-containing compound having the foregoing general formula 1 and/or a nitrogen-containing compound having the foregoing general formula 2.

(37) The method for producing an extruded styrene resin foam as described in (30) or (31), wherein the compound (B) is a nitrogen-containing compound having the foregoing general formula 1 and/or a nitrogen-containing compounds having the foregoing general formula 2 and further a montmorillonite type mineral is made coexist and the blowing agent comprises 99 to 20% by weight of at least one of saturated hydrocarbons having 3 to 5 carbon atoms, 1 to 80% by weight of water, and 0 to 79% by weight of other blowing agent other than water, based on the total amount of the blowing agent.

(38) The method for producing an extruded styrene resin foam as described in (30) or (31), wherein the compound (B) is a boron oxide.

(39) The method for producing an extruded styrene resin foam as described in (38), wherein the blowing agent comprises 70 to 30% by weight of at least one of saturated hydrocarbons having 3 to 5 carbon atoms and 30 to 70% by weight of at least one of methyl chloride and ethyl chloride.

(40) The method for producing an extruded styrene resin foam as described in (30) or (31), wherein the compound (B) is a boron oxide treated with a surface treating agent and the blowing agent comprises at least one of saturated hydrocarbons having 3 to 5 carbon atoms and water, and the extrusion foaming is carried out further in the presence of a montmorillonite type mineral.

(41) The method for producing an extruded styrene resin foam as described in any one of (31), (37) and (40), wherein the montmorillonite type mineral is bentonite.

Hereinafter, the present invention will be described in detail

The styrene resin to be used for the present invention is not specifically limited and usable are styrene homopolymer produced only from styrene monomer, random, block or graft copolymers produced from styrene monomer and a monomer copolymerizable with styrene or its derivatives, modified polystyrene such as post-brominated polystyrene, rubber-reinforced polystyrene, and the like.

Examples of the monomers copolymerizable with styrene are styrene derivatives such as methylstyrene, dimethylstyrene, ethylstyrene, diethylstyrene, isopropylstyrene, bromostyrene, dibromostyrene, tribromostyrene, chlorostyrene, dichlorostyrene and trichlorostyrene; vinyl compounds such as divinylbenzene; unsaturated compounds and their derivatives such as acrylic acid, methacrylic acid, methyl acrylate, methyl methacrylate, ethyl acrylate, ethyl methacrylate, butadiene and acrylonitrile; maleic anhydride, itaconic anhydride and the like. These compounds may be use alone or as a mixture of two or more of them.

As the styrene resins, styrene homopolymer is preferred from the viewpoint of processability.

The present invention is characterized in that one or more of saturated hydrocarbons having 3 to 5 carbon atoms are used as a blowing agent and other blowing agents are used together if required.

Examples of the saturated hydrocarbons having 3 to 5 carbon atoms are propane, n-butane, isobutane, n-pentane, isopentane, neopentane and the like.

Preferable saturated hydrocarbons having 3 to 5 carbon atoms are n-butane, isobutane, and a mixture of n-butane and isobutane from the viewpoints of foamability and thermal insulation property of a foam and especially preferable one is isobutane.

Other blowing agents to be used for the present invention are not specifically limited. Examples of other blowing agents are organic blowing agents including ethers such as dimethyl ether, diethyl ether, methyl ethyl ether, isopropyl ether, n-butyl ether, diisopropyl ether, furan, furfural, 2-methylfuran, tetrahydrofuran and tetrahydropyran; ketones such as dimethyl ketone, methyl ethyl ketone, diethyl ketone, methyl n-propyl ketone, methyl n-butyl ketone, methyl isobutyl ketone, methyl n-amyl ketone, methyl n-hexyl ketone, ethyl n-propyl ketone, and ethyl n-butyl ketone; alcohols such as methanol, ethanol, propyl alcohol, isopropyl alcohol, butyl alcohol, isobutyl alcohol, and tert-butyl alcohol; carboxylic acid esters such as methyl formate, ethyl formate, propyl formate, butyl formate, amyl formate, methyl propionate, and ethyl propionate; and alkyl halides such as methyl chloride and ethyl chloride; inorganic blowing agents such as water and carbon dioxide; and chemical blowing agents such as azo compounds. These blowing agents may be used alone or as a mixture of two or more of them.

Preferable among other blowing agents from the viewpoints of foamability and the formability of a foam are dimethyl ether, diethyl ether, methyl ethyl ether, methyl chloride, ethyl chloride, water, and carbon dioxide and above all, dimethyl ether, methyl chloride, and water are especially preferred.

The use of other blowing agents provides an excellent plasticizing effect and an effect as a blowing assisting agent, resulting a decrease in the extrusion pressure, and enables stable production of a foam.

Especially, when water is used as other blowing agent, a foam having a characteristic cell structure in which relatively small cells with a cell size of about 0.25 mm or smaller (hereinafter referred as to small cells) and relatively large cells with a cell size of about 0.3 to about 1 mm (hereinafter referred as to large cells) exist together in an islands-sea structure is obtained. The foam is provided with improved foamability, formability, productivity, and heat insulation performance. In case of using water as other blowing agent, water may be used in combination with only a saturated hydrocarbon having 3 to 5 carbon atoms. However, it is more preferable to combine water with a saturated hydrocarbon having 3 to 5 carbon atoms and other blowing agents other than water (for example, dimethyl ether) to provide blowing agents composed of three or more components since formability and productivity of a foam are further improved.

In producing the extruded styrene resin foam of the present invention, the amount of a blowing agent to be added or introduced to the styrene resin appropriately varies depending upon the set value of expansion ratio. In general, however, the total amount of blowing agent (s) is preferably from 2 to 20 parts by weight based on 100 parts by weight of the styrene resin. If the amount of the blowing agent used is less than 2 parts by weight, the expansion ratio is low so that it sometimes tends to be difficult to sufficiently provide characteristic properties such as lightweight and heat insulation property as a resin foam. If the amount is more than 20 parts by weight, defects such as voids may be caused in the resultant foam due to the excess amount of the blowing agent., With respect to a blowing agent to be added, the amount of one or more of saturated hydrocarbons having 3 to 5 carbon atoms is preferably 10% by weight or more, more preferably 20% by weight or more, further preferably 25% by weight or more and furthermore preferably 30% by weight or more, based on 100% by weight of the total amount of the blowing agents and, depending on the types of other blowing agents to be added in combination with the saturated hydrocarbon, the amount of the saturated hydrocarbon is most preferably 40% by weight or more based on 100% by weight of the total amount of the blowing agents. If the amount of the saturated hydrocarbon having 3 to 5 carbon atoms is lower than the above defined ranges, in some cases, the thermal insulation property of the obtained foam is deteriorated.

The amount of a blowing agent other than the saturated hydrocarbon having 3 to 5 carbon atoms is preferably 90% by weight or lower, more preferably 80% by weight or lower, further preferably 75% by weight or lower, and furthermore preferably 70% by weight or lower, based on 100% by weight of the total amount of the blowing agents and, depending on the types of the blowing agents, the amount of the blowing agent other than the saturated hydrocarbon is most preferably 60% by weight or lower based on 100% by weight of the total amount of the blowing agents. If the amount of the blowing agent other than the hydrocarbon having 3 to 5 carbon atoms exceeds the foregoing ranges, the plasticizing effect is too high and the mixing state of the styrene resin and the blowing agents in an extruder is uneven and the pressure control in the extruder tends to become difficult.

From the viewpoint of stable production of a foam and materialization of a foam having excellent quality such as appearance, regarding the blowing agents to be added, the amount of one or more of hydrocarbons having 3 to 5 carbon atoms is preferably 90% by weight or lower, more preferably 80% by weight or lower, furthermore preferably 75% by weight or lower, and especially preferably 70% by weight or lower, based on 100% by weight of the total amount of the blowing agents. The amount of blowing agents other than hydrocarbons having 3 to 5 carbon atoms is preferably 10% by weight or more, more preferably 20% by weight or more, furthermore preferably 25% by weight or more, especially preferably 30% by weight or more, based on 100% by weight of the total amount of the blowing agents.

In the case of using at least one ether selected from the group consisting of dimethyl ether, diethyl ether, and methyl ethyl ether as other blowing agent, especially dimethyl ether, the amount to be added is preferably 10 to 90% by weight, more preferably 10 to 80% by weight, and furthermore preferably 10 to 70% by weight, based on 100% by weight of the total amount of the blowing agents in terms of processability or the like.

In the case of using at least one of methyl chloride and ethyl chloride as other blowing agent, the amount to be added is preferably 30 to 70% by weight and more preferably 35 to 65% by weight based on 100% by weight of the total amount of the blowing agents in terms of processability or the like.

In the case of using water as other blowing agent, the amount to be added is preferably 1 to 80% by weight, more preferably 3 to 70% by weight, and especially preferably 5 to 60% by weight based on 100% by weight of the total amount of the blowing agents in terms of processability and formation of the foregoing small cells and large cells. In the case of using water in combination with a blowing agent (such as at least one ether selected from the group consisting of dimethyl ether, diethyl ether, and methyl ethyl ether) other than water as other blowing agent, the amount of water and the amount of the blowing agent other than water are preferably 1 to 75% by weight and 79 to 5% by weight, more preferably 3 to 70% by weight and 77 to 10% by weight, especially preferably 5 to 65% by weight and 75 to 5% by weight, respectively, based on 100% by weight of the total amount of the blowing agents in terms of processability and formation of the foregoing small cells and large cells.

In the case of using carbon dioxide as other blowing agent, the amount to be added is preferably 3 to 70% by weight, more preferably 5 to 60% by weight based on 100% by weight of the total amount of the blowing agent in terms of processability and cell size.

The pressure when adding or introducing blowing agents is not particularly limited and it is sufficient for the pressure to be higher than the inner pressure of an extruder or the like.

With respect to the composition of the blowing agents in the resultant extruded styrene resin foam, the amount of at least one of saturated hydrocarbons having 3 to 5 carbon atoms is preferably 100 to 10% by weight, more preferably 100 to 20% by weight, further more preferably 100 to 25% by weight, and especially preferably 100 to 30% by weight, based on the total amount of the remaining blowing agents, and the amount of other blowing agent is preferably 0 to 90% by weight, more preferably 0 to 80% by weight, further more preferably 0 to 75% by weight, and especially preferably 0 to 70% by weight, based on the total amount of the remaining blowing agents. If the amount of saturated hydrocarbons having 3 to 5 carbon atoms in the remaining blowing agents in the foam is less than the foregoing ranges, it tends to be difficult to obtain excellent thermal insulation performance.

Although the remaining content of saturated hydrocarbons having 3 to 5 carbon atoms in the extruded styrene resin foam obtained varies depending on the types of the saturated hydrocarbons, the density of the foam and the like, the amount is preferably 2 to 10 parts by weight based on 100 parts by weight of the foam. The remaining amount is more preferably 3 to 9 parts by weight, especially preferably 4 to 8 parts by weight for propane, 2.5 to 9 parts by weight, especially preferably 3 to 8 parts by weight for n-butane or isobutane, and 3 to 9 parts by weight for n-pentane, isopentane, and neopentane, based on 100 parts by weight of the foam, in terms of the heat insulation performance and flame retardant performance. Although the remaining content of blowing agents other than saturated hydrocarbons having 3 to 5 carbon atoms varies depending upon the gas permeability and the density of the foam and the like, the amount is preferably 0 to 18 parts by weight, more preferably 0 to 10 parts by weight in order to provide a foam with excellent thermal insulation performance.

In the present invention, together with a halogenated flame retardant (A), there coexists one or more of compounds (B) [hereinafter referred as to flame retardant (B)] selected from the group consisting of phosphorus type flame retardants containing nitrogen atom in a molecule, tetrazole compounds, nitrogen-containing compounds having the foregoing general formula 1, nitrogen-containing compounds having the foregoing general formula 2, metal borates, and boron oxides, and if necessary, there also coexists further a phosphorus acid ester compound.

By virtue of this feature, the extruded styrene resin foam of the present invention is characterized by being provided with high-level flame retardant property as prescribed in JIS A 9511 even if highly combustible hydrocarbons are used as blowing agents. The above mentioned phosphorus type flame retardants containing nitrogen atom in a molecule, tetrazole compounds, nitrogen-containing compounds having the general formula 1 or 2, metal borates, boron oxides and phosphorus acid ester compounds are known as flame retardants for resins. However, it has not been known that, in the case of a foam using highly combustible hydrocarbons as blowing agents, these compounds suppress ignition or combustion of the hydrocarbons upon burning of the foam.

As the halogenated flame retardants to be used for the present invention, any of halogenated flame retardants commonly used for thermoplastic resins may be used without any particular limitation. Examples of brominated flame retardants are bromides of aliphatic or alicyclic hydrocarbons such as hexabromocyclododecane; bromides of aromatic compounds such as hexabromobenzene, ethylene bis (pentabromodiphenyl), decabromodiphenylethane, decabromodiphenyl ether, octabromodiphenyl ether, 2,3- dibromopropyl pentabromophenyl ether and the like; brominated bisphenols and their derivatives such as tetrabromobisphenol A, tetrabromobisphenol A bis(2,3-dibromopropyl ether), tetrabromobisphenol A (2-bromoethyl ether), tetrabromobisphenol A diglycidyl ether, an adduct of tetrabromobisphenol A diglycidyl ether and tribromophenol; oligomers of brominated bisphenol derivatives such as tetrabromobisphenol A polycarbonate oligomer, and an epoxy oligomer of an adduct of tetrabromobisphenol A glycidyl ether and bromobisphenol; bromoaromatic compounds such as ethylene bistetrabromophthalimide, and bis(2,4,6-tribromophenoxy) ethane; brominated acrylic resins; ethylene bisdibromonorbornane dicarboxyimide, and the like. As the chlorinated flame retardants, examples are chlorinated paraffin, chloronaphthalene, perchloropentadecane, chloroaromatic compounds and chloroalicyclic compounds, and the like. These compounds are used alone or as a mixture of two or more of them.

Among the halogenated flame retardants, brominated flame retardants are preferable in terms of flame retardant property and especially, hexabromocyclododecane is preferred due to its compatibility with styrene resins and the like.

The content of the halogenated flame retardant is appropriately adjusted depending upon the amount of the blowing agent to be added, the type and content of other flame retardant to be used in combination with the halogenated flame retardant, and the like so as to obtain flame retardant property as prescribed in JIS A 9511. Generally, however, the content of the halogenated flame retardant is preferably 0.1 to 10 parts by weight, more preferably 0.15 to 9 parts by weight, further preferably 1 to 9 parts by weight, especially preferably 2 to 8 parts by weight, and most preferably 3 to 7 parts by weight, based on 100 parts by weight of the styrene resin. If the amount of the halogenated flame retardant is smaller than the foregoing ranges, it tends to be difficult to obtain the desired flame retardant property and on the other hand, if it is larger than the foregoing ranges, formability and the like when producing a foam are sometimes deteriorated.

The content of one or more of the compounds to be used as the flame retardant (B), which compounds are selected from the group consisting of phosphorus type flame retardants containing nitrogen atom in a molecule, tetrazole compounds, nitrogen-containing compounds having the foregoing general formula 1, nitrogen-containing compounds having the foregoing general formula 2, metal borates, and boron oxides is appropriately adjusted depending upon the amount of the blowing agent to be added, the type and content of the halogenated flame retardant (A), and the like so as to obtain flame retardant property as prescribed in JIS A 9511. Generally, however, the content of the flame retardant (B) is preferably 0.1 to 10 parts by weight, more preferably 0.15 to 9 parts by weight, further preferably 0.2 to 9 parts by weight, especially preferably 1 to 9 parts by weight, and most preferably 1.5 to 8 parts by weight, based on 100 parts by weight of the styrene resin. If the amount of the flame retardant (B) is smaller than the foregoing ranges, it tends to be difficult to obtain the desired flame retardant property and on the other hand, if it is larger than the foregoing ranges, formability and the like when producing a foam are sometimes deteriorated.

Examples of the phosphorus type flame retardants containing nitrogen atom in a molecule to be used as the flame retardant (B) are melamine phosphate, ammonium phosphate, ammonium phosphate amide, phosphoric acid amide, phosphazene, melamine polyphosphate, ammonium polyphosphate, ammonium polyphosphate amide, polyphosphoric acid amide, polyphosphazene, and the like. These compounds may be used alone or as a mixture of two or more of them. These phosphorus type flame retardants may preferably be used even with being treated by a surface coating with one or more of compounds selected from melamine monomer, melamine resin, modified melamine resin, guanamine resin, epoxy resin, phenol resin, urethane resin, urea resin, silicone resin, and the like.

Among the phosphorus type flame retardants containing nitrogen in a molecule, preferable are ammonium phosphate and/or ammonium polyphosphate and more preferable are surface-coated ammonium phosphate and/or surface-coated ammonium polyphosphate since high-level flame retardant as prescribed in JIS A 9511 can easily be achieved even if highly combustible hydrocarbons are used as blowing agents.

Further, as the phosphorus type flame retardants containing nitrogen in a molecule, preferable are compounds which do not inhibit the effect of forming both the aforesaid small cells and large cells in a foam in order to obtain high-level thermal insulation property and the like in the case of using water as other blowing agent, and examples of such compounds are phosphorus type flame retardants containing nitrogen in a molecule which are slightly soluble in water or have a solubility of 10% by weight or lower in water in a temperature range near room temperature (about 10° to 30° C.). If the solubility in water is higher, the effect of forming both small cells and large cells tends to be inhibited. With respect to phosphorus type flame retardants containing nitrogen in a molecule which have high solubility in water or the tendency to inhibit the effect of forming both small cells and large cells, in some cases, these disadvantages can be solved by subjecting the flame retardants to the surface-coating treatment as described before. Consequently, in the case of using water as other blowing agent, it is preferable to use surface-coated phosphorus type flame retardants containing nitrogen in a molecule.

The content of the phosphorus type flame retardant containing nitrogen in a molecule is appropriately adjusted depending upon the type and content of a halogenated flame retardant to be used or, in case of using a flame retardant other than the halogenated flame retardant in combination, the type and content of the flame retardant, and the type and amount of the blowing agent to be added. Generally, however, the content of the phosphorus type flame retardant is preferably 0.1 to 10 parts by weight, more preferably 0.15 to 6 parts by weight, and especially preferably 0.2 to 4 parts by weight, based on 100 parts by weight of the styrene resin. If the amount of the phosphorus type flame retardant containing nitrogen in a molecule is smaller than the foregoing ranges, it tends to be difficult to obtain the desired flame retardant property and on the other hand, if the amount is larger than the foregoing ranges, a styrene resin foam extruded from die tends to be easy to be ruptured, resulting in difficult formation of a satisfactory form.

In case of using the phosphorus type flame retardant containing nitrogen atom in a molecule as the flame retardant (B), one preferable embodiment is to use, as a blowing agent to be added when producing a foam, in combination, one or more of hydrocarbons having 3 to 5 carbon atoms in an amount of 70 to 30% by weight, more preferably 60 to 40% by weight, based on 100% by weight of the total amount of the blowing agents, and one or more of ethers selected from the group consisting of dimethyl ether, diethyl ether and methyl ethyl ether in an amount of 30 to 70% by weight, more preferably 40 to 60% by weight, based on 100% by weight of the total amount of the blowing agents. In such a case, since the ether is relatively quickly expelled from the resultant foam although it has high foaming capability, it tends to be easy to obtain a foam having a relatively great thickness of at least 15 mm with a high expansion ratio by properly combining the ether with a hydrocarbon which is hardly expelled and is effective to obtain the desired thermal insulation property. Furthermore, since the ether enhances the plasticization of a styrene resin, it also tends to be easy to stably produce a foam with lowering the extrusion pressure. Thus, the combination use is preferable.

Examples of the tetrazole compounds to be used as the flame retardant (B) in the present invention are, for instance, guanidine salts of tetrazoles such as tetrazole, bistetrazole and their derivatives; amine salts of tetrazoles such as piperazine salts of tetrazoles and ammonium salts of tetrazoles; and metal salts of tetrazoles such as sodium salts of tetrazoles and manganese salts of tetrazoles. These compounds may be used alone or as a mixture of two or more of them.

With respect to the tetrazole compounds to be used in the present invention, tetrazole compounds having a thermal decomposition temperature of 250° C. or higher are preferable since they are easy to provide the highest flame retarding effect in combination with the aforesaid halogenated flame retardant. Examples of such tetrazole compounds are 5,5'-bistetrazole diguanidine salt, 5,5'-bistetrazole diammonium salt, 5,5'-bistetrazole diaminoguanidine salt, and 5,5'-bistetrazole piperazine salt and most preferable among them is 5,5'-bistetrazole diguanidine salt. When tetrazole compounds having a thermal decomposition temperature of 250° C. or higher is used, it is made possible to avoid their thermal decomposition when producing a styrene resin foam and to cause their thermal decomposition to efficiently generate non-flammable gases when the styrene resin foam is burned. Incidentally, the thermal decomposition temperature generally denotes the temperature at which the weight starts decreasing, measured by differential thermogravimetric analysis.

Further, preferable tetrazole compounds are compounds which do not inhibit the effect of forming both the aforesaid small cells and large cells in a foam in order to obtain high-level thermal insulation property and the like in the case of using water as other blowing agent, and examples of such compounds are tetrazole compounds which are slightly soluble in water or have a solubility of 10% by weight or lower in water in a temperature range near room temperature (about 10° to 30° C.). If the solubility in water is higher, the effect of forming both small cells and large cells tends to be inhibited. With respect to tetrazole compounds which have a high solubility in water or the tendency to inhibit the effect of forming both small cells and large cells, in some cases, these disadvantages can be solved by subjecting these compounds to the surface-coating treatment.

The content of the tetrazole compound to be used in the present invention is appropriately adjusted depending upon the type and content of a halogenated flame retardant to be used or, in case of using a flame retardant other than the halogenated flame retardant in combination, the type and content of the flame retardant, and the type and amount of the blowing agent to be added. Generally, however, the content of the tetrazole compound is preferably 0.1 to 10 parts by weight, more preferably 0.15 to 6 parts by weight, and especially preferably 0.2 to 4 parts by weight, based on 100 parts by weight of the styrene resin. If the amount of the tetrazole compound is smaller than the foregoing ranges, it tends to be difficult to obtain the desired flame retardant property and on the other hand, if the amount is larger than the foregoing ranges, a styrene resin foam extruded from die tends to be easy to be ruptured, resulting in difficult formation of a satisfactory foam. Also, the flame retardant property is scarcely improved if the tetrazole compound is added more.

In case of using the tetrazole compound as the flame retardant (B), one preferable embodiment is to use, as a blowing agent to be added when producing a foam, in combination, one or more of hydrocarbons having 3 to 5 carbon atoms in an amount of 90 to 10% by weight, more preferably 80 to 20% by weight, based on 100% by weight of the total amount of the blowing agents, and one or more of ethers selected from the group consisting of dimethyl ether, diethyl ether and methyl ethyl ether in an amount of 10 to 90% by weight, preferably 20 to 80% by weight, based on 100% by weight of the total amount of the blowing agents.

Nitrogen-containing compounds having the following general formula 1 or general formula 2 to be used as the flame retardant (B) in the present invention are compounds selected from cyanuric acid, isocyanuric acid, and their derivatives. These compounds may be used alone or as a mixture of two or more of them.

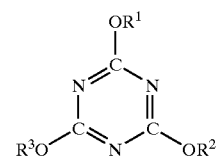

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, or a phenyl group), and a phenyl group, and may be different from each other.

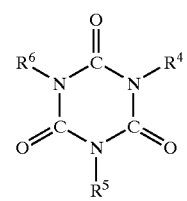

2 wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, or a phenyl group), and a phenyl group, and may be different from each other.

Typical examples of the nitrogen-containing compounds are cyanuric acid, methyl cyanurate, diethyl cyanurate, trimethyl cyanurate, triethyl cyanurate, isocyanuric acid, methyl isocyanurate, diethyl isocyanurate, trimethyl isocyanurate, triethyl isocyanurate, bis(2-carboxyethyl) isocyanurate, tris(2-carboxyethyl) isocyanurate, tris(2,3-epoxypropyl) isocyanurate, and the like.

As the foregoing nitrogen-containing compounds, compounds which are flame-resistant themselves and can be decomposed or melted at 270° to 400° C. are preferable.

Further, as the nitrogen-containing compounds, preferable are compounds which do not inhibit the effect of forming both the aforesaid small cells and large cells in a foam in order to obtain high-level thermal insulation property and the like in the case of using water as other blowing agent, and examples of such compounds are those which are slightly soluble in water or have a solubility of 10% by weight or lower in water in a temperature range near room temperature (about 10° to 30° C.). If the solubility in water is higher, the effect of forming both small cells and large cells tends to be inhibited.

Especially preferable ones among the foregoing nitrogen-containing compounds are cyanuric acid ($R^1$, $R^2$, and $R^3$ in the general formula 1 are hydrogen), isocyanuric acid ($R^4$, $R^5$, and $R^6$ in the general formula 1 are hydrogen), and bis(2-carboxyethyl) isocyanurate ($R^4$ is hydrogen atom, and $R^5$ and $R^6$ are a group wherein Y is ethylene group and X is carboxyl group in the general formula 2).

The content of the foregoing nitrogen-containing compound is appropriately adjusted depending upon the type and content of a halogenated flame retardant to be used or, in the case of using a flame retardant other than the halogenated flame retardant in combination, the type and content of the flame retardant, and the type and amount of a blowing agent to be added, so as to obtain flame retardant property as prescribed in JIS A 9511 and the effect of suppressing ignition and combustion of hydrocarbons evaporated on burning of a foam. Generally, however, the content of the nitrogen-containing compound is preferably 0.1 to 10 parts by weight, more preferably 1 to 9 parts by weight, furthermore preferably 1.5 to 8 parts by weight, and especially preferably 2 to 7 parts by weight based on 100 parts by weight of the styrene resin. If the content of the nitrogen-containing compound is lower than the foregoing ranges, it tends to be difficult to obtain the desired flame retardant property and on the other hand, if the content is more than the foregoing ranges, the formability of a foam and the like tend to be sometimes deteriorated.

Examples of the metal borates to be used as the flame retardant (B) in the present invention are zinc borate, barium borate, magnesium borate, calcium borate, aluminum borate, strontium borate, zirconium borate, tin borate, borax, and their hydrates, and the like.

Among the foregoing metal borates, zinc borate and/or zinc borate hydrate is preferable since they are easy to provide the highest flame retarding effect in combination with the aforesaid halogenated flame retardant.

Further, preferable metal borates are compounds which do not inhibit the effect of forming both the aforesaid small cells and large cells in a foam in order to obtain high-level thermal insulation property and the like in the case of using water as other blowing agent, and examples of such compounds are those which are slightly soluble in water or have a solubility of 10% by weight or lower in water in a temperature range near room temperature (about 10° to 30° C.). If the solubility in water is higher, the effect of forming both small cells and large cells tends to be inhibited.

In the case of using the metal borate, it is preferable to further use a fatty acid metal salt in combination. That is, in the case of using the metal borate, if three types; a halogenated flame retardant, a metal borate and a fatty acid metal salt are mixed with a styrene resin and then the resultant mixture is heated and melted in an extruder or the like, it is presumed that some chemical reactions are promoted in the extruder although the details are not clear, and hence, the resultant extruded styrene resin foam is tinged with a gray tone color When the thermal conductivity of the foam is measured, the thermal conductivity is found to be lowered as compared with that in the case where the foregoing three types do not coexist and consequently the resultant foam is provided with excellent thermal insulation property.

As the fatty acid metal salts preferably used in combination with the metal borate in the present invention, those which are used commonly in this field can be used without any limitation. Examples thereof are barium stearate, calcium stearate, magnesium stearate, lead stearate and zinc stearate. An especially preferable fatty acid metal salt to be used in the present invention is barium stearate.

The content of the metal borate is appropriately adjusted depending upon the type and content of a halogenated flame retardant to be used or, in the case of using a flame retardant other than the halogenated flame retardant in combination, the type and content of the flame retardant, and the type and amount of a blowing agent to be added, so as to obtain flame retardant property as prescribed in JIS A 9511 and the effect of suppressing ignition and combustion of hydrocarbons evaporated on burning of a foam. Generally, however, the content of the metal borate is preferably 0.1 to 10 parts by weight, more preferably 0.15 to 6 parts by weight, furthermore preferably 0.2 to 4 parts by weight, based on 100 parts by weight of the styrene resin. Further in case of using the fatty acid metal salt in combination, the content of the fatty acid metal salt is preferably 0.01 to 2 parts by weight, more preferably 0.05 to 1.5 parts by weight, and especially preferably 0.1 to 1.0 parts by weight, based on 100 parts by weight of the styrene resin. If the content of the metal borate is lower than the foregoing ranges, it tends to be difficult to obtain the desired flame retardant property and on the other hand, if the content is more than the foregoing ranges, the styrene resin foam extruded from die tends to be easy to be ruptured, resulting in difficult formation of a satisfactory foam.

In the case of using the metal borate as the flame retardant (B), one preferable embodiment is to use, as a blowing agent to be added when producing a foam, in combination, one or more of hydrocarbons having 3 to 5 carbon atoms in an amount of 90 to 10% by weight, more preferably 80 to 20% by weight, furthermore preferably 70 to 30% by weight, based on 100% by weight of the total amount of the blowing agents, and one or more of ethers selected from the group consisting of dimethyl ether, diethyl ether and methyl ethyl ether in an amount of 10 to 90% by weight, more preferably 20 to 80% by weight, furthermore more preferably 30 to 70% by weight, based on 100% by weight of the total amount of the blowing agents.

The boron oxides to be used as the flame retardant (B) in the present invention are, for example, diboron dioxide, diboron trioxide, tetraboron trioxide, tetraboron pentoxide. These boron oxides may contain boric acid, metaboric acid, orthoboric acid or the like to the extent within which the effect of the present invention is not deteriorated. An especially preferable one among the boron oxides is diboron trioxide from the viewpoint of flame retardant property. The particle diameter and composition of the boron oxides to be used are not particularly limited.

Further, as the boron oxide to be used in case of using water as other blowing agent, boron oxides treated with a surface treatment agent are preferable. The use of boron oxides subjected to no surface treatment deteriorates the flame retardant property and makes it impossible to obtain high-level thermal insulation property. Although the reason therefor is not clear, it is presumed that a boron oxide is reacted with water added and some of or entire boron oxide becomes boric acid to reduce its flame retarding action and that water added is absorbed by the boron oxide so that the water is inhibited from acting a roll as a blowing agent. Further, the cell structure of the foam obtained in this case, many cases, is not the above-mentioned cell structure composed of mainly cells with a cell size of 0.25 mm or smaller and cells with a cell size of 0.3 to 1 mm but that composed of cells with a uniform cell size. On the other hand, in case of using the surface-treated boron oxide, even when water is added, the flame retardant property of the resultant foam is not deteriorated and the resultant foam has a cell structure composed of mainly cells with a cell size of 0.25 mm or smaller and cells with a cell size of 0.3 to 1 mm wherein these cells are dispersed in an islands-sea structure through cell membranes and the ratio of the area occupied by the cells with a cell size of 0.25 mm or smaller to the area of a section of a foam is preferably 10 to 90%, more preferably 20 to 90%, especially preferably 25 to 80%, and most preferably 30 to 70%, so that excellent thermal insulation property can be retained.

Further, the use of a boron oxide treated with a surface treating agent provides excellent flame retardant property for a long period of time. It is presumed that when a boron oxide subjected to no surface treatment is used, the flame retardant property is gradually deteriorated since the boron oxide gradually absorbs moisture in air to become boric acid and therefore, the use of a surface-treated boron oxide makes it possible to keep the boron oxide from contact with water to prevent conversion to boric acid, resulting in excellent flame retardant property for a long period of time.

The surface treating agent for use in treating the boron oxides is not limited to substances commonly known as surface treating agents but any substances which can insulate boron oxides and water from mutual action can be used. Examples are thermosetting resins such as melamine resin, guanamine resin, urea resin, phenol resin, epoxy resin, silicone resin, imide resin, urethane resin, furan resin, acrylic resin and the like; silane coupling agents such as vinyltrichlorosilane, γ-glycidyloxypropyltrimethoxysilane, γ-aminopropyltrimethoxysilane, γ-mercaptopropyltrimethoxysilane, γ-methacryloxypropyltrimethoxysilane, and the like; titanium type surface treatment agents such as isopropyl triisostearoyl titanate, tetraalkoxytitanium, titanium acylate, diisopropoxybis(acetylacetonato) titanium and the like; aluminum type surface treating agents such as (alkylacetoacetato)aluminum diisopropylate, aluminum tris (acetylacetonate), and the like; and thermoplastic resins such as fluorine-containing resin, amide resin, arylate resin, imide resin, polyethylene resin, polypropylene resin, vinyl chloride resin, polycarbonate resin, polystyrene resin, poly (ethylene terephthalate), poly(methyl methacrylate), and the like. The use of two or more of these surface treating agents in combination falls within the scope of the present invention. Further, a boron oxide can be surface-treated with an inorganic substance and, for example, a coating film of titanium oxide, silicon oxide or the like can be formed on a boron oxide. Like that, in the present invention, regardless of the organic substances or inorganic substances, boron oxides can be surface-treated with these substances. Incidentally, the use of two or more types of organic and inorganic surface treating agents also falls within the scope of the present invention.

Taking that the surface-treating agent is used for preventing contact between the boron oxide and water into consideration, a coating film formed by the surface treatment is preferably water-insoluble and water-repelling. Moreover, it is preferable to use a thermosetting resin as a surface treating agent, taking into consideration that it can stand shearing in an extrusion foaming step in the production of a foam and further that the surface treatment using it can easily be carried out. Further, from the viewpoint of realizing flame retardant property and high-level thermal insulation property, melamine resin and phenol resin are more preferable.

The amount of the surface treating agents to be used for the surface treatment of boron oxides is not particularly limited. However, the amount is preferably 0.1 to 10 parts by weight based on 100 parts by weight of the boron oxide. If the amount of the surface treating agent is less than 0.1 part by weight, in some cases, the surface coating ratio is small, resulting in a poor surface treatment effect. If the amount of the surface treating agent is more than 10 parts by weight, the surface treatment effect is sufficient, but sometimes the effect of suppressing ignition of hydrocarbons and the flame retarding effect by the boron oxide are inhibited.

The method for surface-treating boron oxides includes the following examples but it is not at all limited to these examples.

(1) A boron oxide and a surface treating agent are mixed using an apparatus having a mixing function. As the apparatus having a mixing function, Henshel mixer, ribbon blender and the like commonly used are satisfactorily usable and also usable are, for example, mixing apparatus for powder coating such as New Gramachine manufactured by SEISHIN ENTERPRISE CO., LTD., and a mixer and granulator, NMG, manufactured by Nara Machinery Co., Ltd.

(2) A surface treating agent is dissolved in an approproate organic solvent and a boron oxide is added to and immersed in the resultant solution and then dried.

(3) A liquid surface treating agent or a solid surface treating agent is dissolved in an organic solvent and the resultant solution is sprayed onto a boron oxide dispersed in air stream, followed by drying. As the apparatus for spraying the solution to the air stream dispersion, GROW MAX manufactured by Fuji Paudal Co., Ltd. can be exemplified.

(4) A boron oxide is coated with a surface treating agent by mechanical impact. As the apparatus for applying mechanical impact, NHS (HYBRIDIZATION SYSTEM) manufactured by Nara Machinery Co., Ltd. can be exemplified. This method is effective for solid surface treating agents.

In case of using a thermosetting resin as the surface treating agent, preferably, a coating film of a resin before curing is formed on the surface of a boron oxide by any of the foregoing methods (1) to (4) and thereafter, a heat curing of the coating film is carried out by heating with use of a common drying apparatus, a fluidized bed type drying apparatus or the like. Alternatively, using powder resin after heat curing, a surface treatment can be carried out by the method (4).

Incidentally, in the present invention, the covering ratio may be increased by repeating a surface treatment a plurality of times, for example, by carrying out a surface treatment and again carrying out using the same or different surface treating agent.

The content of the boron oxide (in case of using a surface-treated boron oxide, the content means the content of only boron oxide excluding that of the surface treating agent) is appropriately adjusted depending upon the type and content of a halogenated flame retardant to be used or, in case of using a flame retardant other than the halogenated flame retardant in combination, the type and content of the flame retardant, and the type and amount of a blowing agent to be added, so as to obtain flame retardant property as prescribed in JIS A 9511 and the effect of suppressing ignition and combustion of hydrocarbons evaporated on burning of a foam. Generally, however, the content of the boron oxide is preferably 0.1 to 10 parts by weight, more preferably 1 to 9 parts by weight, furthermore preferably 1.5 to 8 parts by weight, based on 100 parts by weight of the styrene resin. If the content of the boron oxide is lower than the foregoing ranges, it tends to be difficult to obtain the desired flame retardant property and on the other hand, if the content is more than the foregoing ranges, the styrene resin foam extruded from die tends to become easy to be ruptured, resulting in difficult formation of a satisfactory form body.

In the case where a boron oxide and a flame retardant other than the boron oxide are used in combination, the flame retardant other than the boron oxide may also be surface-treated for the same purpose as that for the boron oxide.

In case of using the boron oxide as other flame retardant and methyl chloride and/or ethyl chloride as other blowing agent, as a blowing agent to be added when producing a foam, a blowing agent mixture comprising 35 to 65% by weight, preferably 40 to 60% by weight, of a blowing agent composed of methyl chloride, ethyl chloride or a mixture thereof, and 65 to 35% by weight, preferably 60 to 40% by weight, of a blowing agent composed of one or more of hydrocarbons having 3 to 5 carbon atoms, based on 100% by weight of the total amount of the blowing agents, is preferable. If the content of methyl chloride, ethyl chloride, or a mixture thereof is more than the forgoing ranges, it tends to take place that the cell size becomes large, the quantity of heat by radiation heat transfer is increased, and the thermal conductivity of the resultant foam is increased. On the other hand, if the content is less than the foregoing ranges, it tends to takes place that the plasticization of the styrene resin is insufficient to deteriorate the production stability and that the density of the resultant foam is sufficiently small and coarse cells are formed, so that it is difficult to obtain a foam with an excellent quality.

In the present invention, in addition to the halogenated flame retardant (A) and one or more of compounds (B) selected from the group consisting of phosphorus type flame retardants containing nitrogen atom in a molecule, tetrazole compounds, nitrogen-containing compounds having the foregoing general formula 1, nitrogen-containing compounds having the foregoing general formula 2, metal borates, and boron oxides, a phosphoric acid ester type compound (except nitrogen-containing phosphoric acid ester compound) is used in combination to further sufficiently suppress ignition and combustion of hydrocarbons evaporated upon burning of a foam using hydrocarbons with high combustibility.

Typical examples of the phosphoric acid ester compounds to be used in the present invention are aliphatic type phosphoric acid esters such as trimethyl phosphate, triethyl phosphate, tributyl phosphate, tri(2-ethylhexyl) phosphate, tributoxyethyl phosphate, monoisodecyl phosphate, 2-acryloyloxyethyl acid phosphate, 2-methacryloyloxyethyl acid phosphate, and the like: and aromatic type phosphoric acid esters such as triphenyl phosphate, tricresyl phosphate, trixylenyl phosphate, tris(isopropylphenyl) phosphate, tris (phenylphenyl) phosphate, trinaphthyl phosphate, cresyl diphenyl phosphate, xylenyl diphenyl phosphate, diphenyl (2-ethylhexyl) phosphate, di(isopropylphenyl) phenyl phosphate, diphenyl (2-acryloyloxyethyl) phosphate, diphenyl (2-methacryloyloxyethyl) phosphate, and the like. Further, examples include phosphoric acid esters having two or more of phosphoric acid ester groups represented by the following general formula 3:

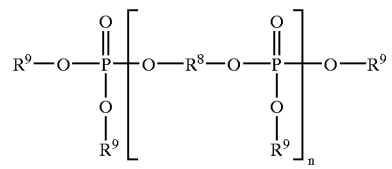

wherein $R^8$ is a residual group of resorcinol, hydroquinone, bisphenol A or the like; $R^9$ is phenyl group, tolyl group, xylyl group or the like; and n is an integer of 1 or more.

The phosphoric acid esters represented by the general formula 3 include aromatic type di(phosphoric acid ester)s (n=1 in the foregoing general formula 3) such as resorcinol-bis(dipheny lphosphate), resorcinol-bis(dixylenyl phosphate), resorcinol-bis(dicresyl phosphate), bisphenol A-bis(diphenyl phosphate), bisphenol A-bis(dixylenyl phosphate), bisphenol A-bis(dicresyl phosphate), hydroquinone-bis(diphenyl phosphate), hydroquinone-bis (dixylenyl phosphate), hydroquinone-bis(dicresyl phosphate) and the like; aromatic type poly(phosphoric acid ester)s (n is 2 or more in the foregoing general formula 3) such as poly[resorcinol-(di-2,6-xylyl) phosphate], poly (bisphenol A-cresyl phosphate), poly[hydroquinone-(2,6-xylyl)phosphate, and the like.

The content of the phosphoric acid ester compounds is appropriately adjusted depending upon the amount of a blowing agent to be added so as to obtain flame retardant property and the effect of suppressing ignition and combustion of hydrocarbons evaporated on burning of a foam. The content is preferably 0.1 to 10 parts by weight, more preferably 0.3 to 9 parts by weight, and furthermore preferably 0.5 to 8 parts by weight, based on 100 parts by weight of the styrene resin. If the content of the phosphoric acid ester compound is less than the foregoing ranges, the synergistic effect tends to be difficult to be achieved and on the other hand, if the content is more than the foregoing ranges, the formability in producing a foam is sometimes deteriorated.

In the present invention, as the flame retardant (B), phosphorus type flame retardants containing nitrogen atom in a molecule, tetrazole compounds, nitrogen-containing compounds having the foregoing general formula 1, nitrogen-containing compounds having the foregoing general formula 2, metal borates, and boron oxides may be used alone or in combination of two or more of them. One or more of phosphorus acid ester type compounds can also be used in combination with the flame retardant (B).

In the present invention, a halogenated flame retardant (A), and one or more of compounds (B) selected from the group consisting of phosphorus type flame retardants containing nitrogen atom in a molecule, tetrazole compounds, nitrogen-containing compounds having the general formula 1, nitrogen-containing compounds having the general formula 2, metal borates, and boron oxides, and further preferably a phosphoric acid ester type compound are used in an appropriate amount within the foregoing ranges. Although its mechanism of contribution to the flame retardant property has not been made clear, it is possibly attributed to the synergistic effects on combustion inhibition that halogens capture radicals generated upon burning of a styrene resin foam; that non-flammable gases generated by decomposition, melting or the like of the flame retardants (B) decrease the oxygen concentration in the periphery of the burning site; and that the resultant non-flammable layer or intumescent char constitutes a non-flammable layer or thermal insulation layer. Thus, the feature tends to be made easy to obtain high-level flame retardant property.

That is, in case of using only a halogenated flame retardant (A) as a flame retardant, the use thereof in a small amount tends not necessarily to provide flame retardant property stably. Further, when the amount is increased, there is a tendency that a foam is torn off or broken immediately after being extruded out of die, resulting in failure of obtaining a satisfactory foam product. Furthermore, particularly when a saturated hydrocarbon is used as blowing agent, there is a tendency that remaining blowing agents are released from a foam to atmospheric air upon burning of the foam and combusted and consequently combustion is spread owing to the surface melting of the foam by the combustion heat of the blowing agents. However, use of a halogenated flame retardant (A) and a flame retardant (B) in combination exhibits excellent effects of inhibiting the combustion of the remaining blowing agents and significantly lessening or eliminating such tendency. Thus, the use of these flame retardants in appropriate amounts makes it possible to obtain a foam product having excellent flame retardant property with a stable molding processing.

Moreover, with respect to the amount of the flame retardant (B) used, owing to combination use of the flame retardant (B) with a halogenated flame retardant (A), even addition in very small amounts as low as several parts by weight based on 100 parts by weight of a thermoplastic resin can attain the effects of the present invention, as compared with the case of using the flame retardant (B) alone wherein the amount of the flame retardant (B) is generally required to be 10 to 30 parts by weight or higher, based on 100 parts by weight of a thermoplastic resin, although it varies depending upon the type of the resin.

In the present invention, if required, the extruded styrene resin form can contain the following additives to the extent within which the effects of the present invention are not inhibited: inorganic compounds such as silica, talc, calcium silicate, wollastonite, kaolin, clay, mica, zinc oxide, titanium oxide, calcium carbonate and the like; processing assisting agents such as sodium stearate, magnesium stearate, barium stearate, liquid paraffin, olefin type wax, stearylamide type compounds and the like; phenol type antioxidants, phosphorus type stabilizers, light resistant stabilizers such as benzotriazoles, hindered amines, other flame retardants, antistatic agents, coloring agents such as pigments.

In case of using water as other blowing agent, the function of forming the foregoing small cells and large cells in a foam can be further improved by adding a montmorillonite type mineral such as laponite, bentonite, montmorillonite and the like; water absorptive or water-swellable clay minerals such as swellable fluoro-mica; and the foregoing mineral substances modified with organic component; water absorptive polymers, dehydrated silica having silanol group such as AEROSIL produced by Nippon Aerosil Co., Ltd. (in the present invention, these substances are named generally as water absorptive substances). Consequently, the formability, the productivity and thermal insulation performance of the foam can be further improved.

The water absorptive substances are employed since they are supposed to be possible to form a gel upon absorbing water, which is not compatible with a styrene resin, and to uniformly disperse water in a gel state into the styrene resin.

The content of the water absorptive substance to be used in the present invention is appropriately adjusted depending upon the amount of water to be added and the like. The content is preferably 0.2 to 10 parts by weight, more preferably 0.3 to 8 parts by weight, and especially preferably 0.5 to 7 parts by weight, based on 100 parts by weight of styrene resin. If the content of the water absorptive substance is less than the foregoing ranges, the amount of water absorbed by the water absorptive substance is deficient and therefore voids are sometimes formed due to poor dispersion of water in an extruder, resulting in a defective molded body and on the other hand, if the content is more than the foregoing ranges, poor dispersion of the water absorptive substance sometimes takes place in an extruder, resulting in uneven foaming and it leads to deterioration of and variations in thermal insulation property of a foam.

Among the foregoing water absorptive substances, montmorillonite type minerals are preferable and above all, bentonite is especially preferable.

In the present invention, the montmorillonite type minerals are intended to include montmorillonite, and clay minerals such as bentonite which contains montmorillonite as a main component. The bentonite is intended to mean basic clay minerals containing montmorillonite as a main component and inclusion minerals such as quartz, α-cristobalite, opal, feldspar, mica and the like. In terms of chemical components, bentonite contains silicon oxide as a main component and aluminum oxide which is a chemical component in the second largest amount. Incidentally, montmorillonite is said to be a clay mineral which is composed of thin silicate layers of about 1 nm thickness and in which the layer surface of the platy crystal particles is charged to be minus and electrically kept neutral through exchangeable cations, such as sodium or calcium, intervening between the layers and when montmorillonite is brought into contact with water, the exchangeable cations existing between the layers are hydrated to swell the space between the layers.

Especially preferable as the montmorillonite type minerals to be used in the present invention is bentonite. Representative examples of bentonite are natural bentonite and refined bentonite. Organo-bentonite or the like is also usable. The montmorillonite type minerals in the present invention include products obtained by modifying montmorillonite, such as an anionic polymer-modified montmorillonite, a silane-treated montmorillonite, montmorillonite compounded with a highly polar organic solvent, and the like.

Bentonite is available as Bentonite Hodaka, BENGEL, and the like from HOJUN KOGYO CO., LTD. Such bentonites can be used alone or as a mixture of two or more of them.

The content of the montmorillonite type mineral such as bentonite to be used in the present invention is appropriately adjusted depending upon the amount of water to be added and the like. The content is preferably 0.2 to 10 parts by weight, more preferably 0.3 to 8 parts by weight, especially preferably 0.5 to 7 parts by weight, most preferably 1 to 5 parts by weight, based on 100 parts by weight of styrene resin. If the content of the montmorillonite type mineral is less than the foregoing ranges, the amount of water absorbed by the montmorillonite type mineral is insufficient as compared to the amount of water added under pressure and it tends to take place that voids are formed owing to poor dispersion of water in an extruder, resulting in a defective molded body. On the other hand, if the content is more than the foregoing ranges, the amount of the inorganic powder existing in styrene resin becomes excessive so that the inorganic powder is difficult to be uniformly dispersed into the styrene resin, and thus uneven foaming tends to be caused. Further, it tends to be difficult to maintain closed cell structure. Consequently, the deterioration of and variations in thermal insulation property of the resultant foam tend to occur. The mixing ratio of water/montmorillonite type mineral (or bentonite) by weight is preferably 0.02 to 20, more preferably 0.1 to 10, especially preferably 0.15 to 5, and ideally, a mixing ratio of 0.25 to 2 is most preferable.

The average of the cell sizes in a styrene resin foam obtained according to the present invention is preferably 0.05 to 1 mm, more preferably 0.06 to 0.6 mm, and especially preferably 0.8 to 0.4 mm.

Moreover, in a foam in which small cells with a cell size of 0.25 mm or smaller and large cells with a cell size of 0.3 mm or larger coexist, the ratio of the area occupied by the small cells to the area of a section of the foam (the occupying area ratio per unit sectional area) is preferably 10 to 90%, more preferably 20 to 90%, especially preferably 25 to 80%, and most preferably 30 to 70%.

In the case of using water as other blowing agent, especially preferable ones among the flame retardants (B) are one or more of compounds selected from the group consisting of tetrazole compounds, nitrogen-containing compounds having the foregoing general formula 1, nitrogen-containing compounds having the foregoing general formula 2, and boron oxides surface-treated with a surface treating agent. More preferable ones are nitrogen-containing compounds having the foregoing general formula 1 and/or nitrogen-containing compounds having the foregoing general formula 2 and most preferable ones are nitrogen-containing compounds having the foregoing general formula 2. Furthermore, isocyanuric acid and/or bis(2-carboxyethyl) isocyanurate are preferable. These preferable flame retardants (B) are further preferably used together with a phosphoric acid ester type compound.

In case of using water as other blowing agent, one preferable embodiment is to use isocyanuric acid and/or bis(2-carboxyethyl) isocyanurate as the flame retardant (B) and a montmorillonite type meineral, especially bentonite, as the water absorptive substance since the function of forming small cells and large cells is improved and hence a foam having improved thermal insulation property and excellent flame retardant property can be obtained. Especially, the most preferable embodiment is to use isocyanuric acid and/or bis(2-carboxyethyl) isocyanurate as the flame retardant (B) and further a phosphoric acid ester type compound in combination and a montmorillonite type mineral, especially bentonite, as the water absorptive substance since the function of forming small cells and large cells is further improved and hence a foam having further improved thermal insulation property and especially excellent flame retardant property can be obtained.

In case of using water as other blowing agent, in terms of processability and the aforesaid formation of small cells and large cells, it is preferable to use, as a blowing agent, a blowing agent comprising at least one of hydrocarbons having 3 to 5 carbon atoms in an amount of 99 to 20% by weight, preferably 97 to 30% by weight, more preferably 95 to 40% by weight, and water in an amount of 1 to 80% by weight, preferably 3 to 70% by weight, more preferably 5 to 60% by weight, based on 100% by weight of the total amount of the blowing agents. In case of using water and a blowing agent other than water (such as at least one ether selected from the group consisting of dimethyl ether, diethyl ether, and methyl ethyl ether) in combination as other blowing agent, in terms of processability and the aforesaid formation of small cells and large cells, it is preferable to use, as a blowing agent, a blowing agent comprising at least one of hydrocarbons of 3 to 5 carbons in amount of 99 to 20% by weight, preferably 97 to 30% by weight, more preferably 95 to 40% by weight, water in an amount of 1 to 75% by weight, preferably 3 to 70% by weight, more preferably 5 to 65% by weight, and other blowing agent other than water in an amount of 79 to 5% by weight, preferably 77 to 10% by weight, more preferably 75 to 15% by weight, based on 100% by weight of the total amount of the blowing agents.

In the present invention, a hydrocarbon having 3 to 5 carbon atoms, other blowing agent, a halogenated flame retardant (A) and a flame retardant (B), and other additives are used in combination to make it possible to obtain an extruded styrene resin foam having both thermal insulation property and flame retardant property meeting thermal insulating board No. 3 of extruded polystyrene foam prescribed JIS A 9511 without using any flon as a blowing agent. That is, it is made possible to obtain an extruded styrene resin foam having thermal insulation property of 0.028 W/mK or lower in terms of thermal conductivity and flame retardant property meeting the requirement that the flame is extinguished within 3 seconds and neither remaining ember nor spreading flame beyond the indicating line of combustion limit exists in the combustion test prescribed in JIS A 9511.

An extruded styrene resin foam having thermal insulation property and flame retardant property meeting thermal insulating board No. 3 of extruded polystyrene foam prescribed JIS A 9511 can be obtained by using preferably n-butane and/or isobutane, especially preferably isobutane among saturated hydrocarbons having 3 to 5 carbon atoms. Further, as other blowing agent, dimethyl ether or water is preferably used. The use of water as a blowing agent is especially preferable to make the foregoing small cells and large cells exist together and in this case, it is preferable to use a water absorptive substance, especially preferably a montmorillonite type mineral, most preferably bentonite. Although any compounds described in the present invention are preferably used as the flame retardant (A), especially preferable one is hexabromocyclododecane. Although any compounds described in the present invention are preferably used as the flame retardant (B), further preferably usable are flame retardants (B) to be used preferably in case of using water as other blowing agent. Isocyanuric acid and/or bis(2-carboxyethyl) isocyanurate are especially preferable and use of them in combination with a phosphoric acid ester type compound is most preferable.

The styrene resin foam of the present invention can be produced by supplying a styrene resin, a halogenated flame retardant (A), a flame retardant (B), and if necessary, a phosphoric acid ester type compound and other additives to a heating/melting means such as an extruder by a variety of methods such as (1) mixing a halogenated flame retardant (A), a flame retardant (B), and if necessary, a phosphoric acid ester type compound and other additives with a styrene resin and then heating and melting the mixture, (2) heating and melting a styrene resin and then adding a halogenated flame retardant (A), a flame retardant (B), and if necessary, a phosphoric acid ester type compound and other additives to the styrene resin and kneading the resultant, (3) previously preparing a molten composition by mixing a halogenated flame retardant (A), a flame retardant (B) and if necessary, a phosphoric acid ester type compound and other additives with a styrene resin and then heating and melting the mixture, and supplying the molten composition to an extruder for heating and melting again; and in any appropriate stage, adding a blowing agents under high pressure to the styrene resin to make the resin into a flowable gel, cooling the gel to a temperature suitable for extrusion foaming; and extruding the flowable gel to a low pressure region to form a foam.

The heating temperature, the melting duration, and the melting means for heating and melting the styrene resin are not particularly limited. It is sufficient for the heating temperature to be a temperature not lower than the temperature at which the styrene resin is melted. The melting duration cannot be determined definitely since it varies depending upon the extrusion quantity per unit time, the melting means and the like, and the time required to uniformly disperse the blowing agent into the styrene resin is appropriately selected. Further the melting means is not particularly limited. Examples are a screw type extruder, and the like.

BEST MODE FOR CARRYING OUT THE INVENTION

Next, the extruded styrene resin foam and its production method according to the present invention will be further explained in detail on the basis of Examples. However, the present invention is not at all limited to only such Examples. Incidentally, unless given any particular explanation, the terms, "parts" means parts by weight and "%" means % by weight.

Examples A1 to A5 and Comparative Exampes A1 to A5

As characteristic properties of foams obtained by Examples A1 to A5 and Comparative Examples A1 to A5 described below, the expansion ratio, the closed cell ratio, the average cell size, the amount of remaining blowing agent, the foam appearance, the thermal conductivity, combustibility and the foam thickness were determined according to the following methods.

In the description hereinafter, the abbreviated symbols respectively denote the following substances:

DME: dimethyl ether
HBCD: hexabromocyclododecane

1) Expansion Ratio

An approximate density of styrene resin was assumed to be 1.05 (g/cm$^3$) and the expansion ratio was calculated by the following equation:

Expansion ratio (times)=1.05/(foam density)(g/cm$^3$).

2) Closed Cell Ratio

Using a multi-pycnometer (manufactured by YUASA IONICS CO., LTD.), the closed cell ratio was measured according to ASTM D-2856.

3) Average Cell Size

A longitudinal section (the section obtained by cutting the foam in the thickness direction along the direction vertical to the extrusion direction, hereinafter the same) of each extruded foam was photographed at ×30 magnification with a scanning electron microscope (S-450, manufactured by Hitachi, Ltd.), and the obtained photograph was copied with a dry type copying machine. The obtained copy was subjected to a first treatment of filling parts to corresponding to cells with a black ink, and the image obtained by the first treatment was subjected to processing with an image processing apparatus (PIAS-II manufactured by PIAS Co., Ltd.) to determine the average cell size.

4) Amount of Remaining Blowing Agent

Twenty days after the production, a foam was analyzed using a gas chromatograph (GC-14A manufactured by Shimadzu Corporation) to determine the amount of remaining blowing agent (g) based on 100 g of the foam. In the analysis, isobutane and DME were set to be objects to be analyzed.

5) Foam Appearance

The appearance of a foam was evaluated according to the following evaluation criteria.

○: No unfoamed resin parts and no voids are found in the section and wrinkling and projection are scarcely found on the surface.

X: A large number of unfoamed resin parts and voids exist in the section, and/or, wrinkling and projections considerably exist on the surface.

6) Thermal Conductivity

The thermal conductivity of a foam was measured according to JIS A 9511 and the evaluation was carried out according to the following evaluation criteria. The measurement was carried out for foams 10 days after the production.

○: Thermal conductivity is 0.028 W/mK or lower.

X: Thermal conductivity exceeds 0.028 W/mK.

7) Combustibility

Using specimens each having a thickness of 10 mm, a length of 200 mm and a width of 25 mm, a combustion test was carried out with n=10 (the number of the specimens was 10) according to JIS A 9511 and the combustibility was evaluated in terms of flame extinguishing time according to the following evaluation criteria. The measurement was carried out for foams 10 days after the production.

⊚: The flame extinguishing time is within 2 seconds for all of 10 specimens.

○: The flame extinguishing time is within 3 seconds for all of 10 specimens.

Δ: The flame extinguishing time is longer than 3 seconds for 1 or more and 3 or less specimens.

X: The flame extinguishing time is longer than 3 seconds for 4 or more specimens.

8) Foam Thickness

Each foam was cut along the section at right angles to the extrusion direction and the thickness of the foam was measured with slide calipers and the average value was calculated. The value was obtained by counting as one fractions more than 0.5 inclusive and cutting away the rest and expressed by mm unit.

Example A1

To 100 parts of a polystyrene resin (produced by Nippon Steel Chemical Co., Ltd., trade name: Estyrene G-17, melt index (MI): 3.1), 0.5 part of talc as a nucleating agent, 3.0 parts of hexabromocyclododecane (produced by ALBEMARLE CORPORATION, SAYTEX HBCD-LM) and 2.0 parts of ammonium polyphosphate (produced by Chisso Corporation,TERRAJU C60) as flame retardants, and further 0.25 part of barium stearate were added and dry-blended and then the resultant resin mixture was supplied at a rate of about 40 kg/hr to a two-stage extruder composed of a 65 mm diameter extruder and a 90 mm diameter extruder connected in series. The resin mixture supplied to the foregoing 65 mm diameter extruder was heated to 200° C. to be melted, plasticized and kneaded, and then the resultant was cooled to 120° C. in the 90 mm diameter extruder connected to the former and extruded to the atmospheric air through a die with a rectangular cross section of 2 mm in the thickness direction and 50 mm in the width direction attached to the tip of the 90 mm diameter extruder to obtain an extruded foam having a rectangular parallelepiped shape.

In this case, as blowing agents, isobutane and dimethyl ether were introduced under pressure into the polystyrene resin so that the total amount of isobutane and dimethyl ether was 8 parts based on 100 parts of the polystyrene resin and the proportions of isobutane and dimethyl ether were 50% by weight and 50% by weight, respectively, based on 100% by weight of the total of the blowing agents, through different lines, respectively, at the tip portion of the foregoing 65 mm diameter extruder (the end portion to which the 90 mm diameter extruder was connected at the end opposite to the die of the extruder). The characteristic properties of the obtained foam are shown in Table A. In Table A, the amount of blowing agents introduced under pressure and the amount of the flame retardant were expressed in terms of the number of parts to 100 parts of the polystyrene resin (the same in Tables hereinafter).

Examples A2, A3

Extruded foams were obtained in the same conditions as in Example A1 except that the amount of ammonium polyphosphate was changed to those described in Table A. The characteristic properties of the obtained foams are shown in Table A.

Examples A4, A5

Extruded foams were obtained in the same conditions as in Example A1 except that the amounts of isobutane, dimethyl ether, hexabromocyclododecane, and ammonium polyphosphate were changed to those described in Table A. The characteristic properties of the obtained foams are shown in Table A.

Comparative Example A1

An extruded foam was obtained in the same conditions as in Example A1 except that no ammonium polyphosphate was added. The characteristic properties of the obtained foam are shown in Table A.

Comparative Example A2

An extruded foam was obtained in the same conditions as in Example A1 except that the amount of hexabromocyclododecane was changed and no ammonium polyphosphate was added. The characteristic properties of the obtained foam are shown in Table A.

Comparative Example A3

An extruded foam was obtained in the same conditions as in Example A1 except that no hexabromocyclododecane was added. The characteristic properties of the obtained foam are shown in Table A.

TABLE A

|  | Example | | | | | Comparative Example | | |
| --- | --- | --- | --- | --- | --- | --- | --- | --- |
|  | A1 | A2 | A3 | A4 | A5 | A1 | A2 | A3 |
| Amount of blowing agent introduced under pressure (parts) | | | | | | | | |
| Isobutane | 4 | 4 | 4 | 5 | 5.5 | 4 | 4 | 4 |
| DME | 4 | 4 | 4 | 3 | 2.5 | 4 | 4 | 4 |
| Amount of flame retardant (parts) | | | | | | | | |
| HBCD | 3 | 3 | 3 | 4 | 4.5 | 3 | 12 | — |
| Ammonium polyphosphate | 2 | 3 | 4 | 3 | 4 | — | — | 2 |
| Expansion ratio (itmes) | 31 | 30 | 32 | 31 | 30 | 32 | 28 | 33 |
| Closed cell ratio (%) | 91 | 90 | 86 | 90 | 85 | 92 | 55 | 90 |
| Average cell size (mm) | 0.25 | 0.22 | 0.22 | 0.21 | 0.20 | 0.29 | 0.23 | 0.29 |
| Amount of remaining blowing agent (g) | | | | | | | | |
| Isobutane | 3.7 | 3.6 | 3.5 | 4.5 | 5.3 | 3.7 | 1.2 | 3.7 |
| DME | 0.1 | 0.1 | 0.1 | 0.1 | 0.1 | 0.1 | 0.1 | 0.1 |
| Foam appearance | ○ | ○ | ○ | ○ | ○ | ○ | X | ○ |
| Thermal conductivity | ○ | ○ | ○ | ○ | ○ | ○ | X | ○ |
| Combustibility | ⊚ | ○ | ○ | ○ | ○ | X | Δ | X |
| Foam thickness (mm) | 45 | 43 | 47 | 44 | 42 | 46 | 42 | 47 |

As being made clear by comparison of Examples A1 to A5 and Comparative Examples A1 to A3, the foams of the present invention obtained by using isobutane as one of saturated hydrocarbons of 3 to 5 carbon atoms and dimethyl ether as other blowing agent and HBCD as a halogenated flame retardant (A) and ammonium polyphosphate as a flame retardant (B) were found excellent in the foam appearance, thermal conductivity, and flame retardant property.

Examples B1 to B4 and Comparative Examples B1 to B2

As characteristic properties of foams obtained by Examples B1 to B4 and Comparative Examples B1 to B2 described below, the expansion ratio, the closed cell ratio, the average cell size, the amount of remaining blowing agent, the foam appearance, the thermal conductivity and the combustibility were determined according to the following methods.

1) Expansion Ratio

An approximate density of styrene resin was assumed to be 1.05 (g/cm$^3$) and the expansion ratio was calculated by the following equation:

Expansion ratio (times)=1.05/(foam density) (g/cm$^3$)

2) Closed Cell Ratio

Using a multi-pycnometer (manufactured by Beckman Japan Co., Ltd.), the closed cell ratio was measured according to ASTM D-2856.

3) Average Cell Size

A longitudinal section of each extruded foam was photographed at ×30 magnification with a scanning electron microscope (S-450, manufactured by Hitachi, Ltd.), and the obtained photograph was copied with a dry type copying machine. The obtained copy was subjected to a first treatment of filling parts to corresponding to cells with a black ink, and the image obtained by the first treatment was subjected to processing with an image processing apparatus (PIAS-II manufactured by PIAS Co., Ltd.) to determine the average cell size.

4) Amount of Remaining Blowing Agent

Twenty days after the production, a foam was analyzed using a gas chromatograph (GC-14A manufactured by Shimadzu Corporation) to determine the amount of remaining blowing agent (g) based on 100 g of the foam. In the analysis, isobutane and DME were set to be objects to be analyzed.

5) Foam Appearance

The appearance of a foam was evaluated according to the following evaluation criteria.

○: No unfoamed resin parts and no voids are found in the section and wrinkling and projection are scarcely found on the surface.

Δ: A small number of unfoamed resin parts and voids exist in the section, and/or, a small number of wrinkling and projections exist on the surface.

X: A large number of unfoamed resin parts and voids exist in the section, and/or, wrinkling and projections considerably exist on the surface.

6) Thermal Conductivity

The thermal conductivity of a foam was measured using an apparatus for measuring thermal conductivity, HC-072 (manufactured by EKO Instruments trading Co., Ltd.) according to JIS A 9511 and the evaluation was carried out according to the following evaluation criteria. The measurement was carried out for foams 20 days after the production.

○: Thermal conductivity is 0.028 W/mK or lower.

X: Thermal conductivity exceeds 0.028 W/mK.

7) Combustibility

Using specimens each having a thickness of 10 mm, a length of 200 mm and a width of 25 mm, a combustion test was carried out with n=10 according to JIS A 9511 and the combustibility was evaluated in terms of flame extinguishing time according to the following evaluation criteria. The measurement was carried out for foams 20 days after the production.

◉: The flame extinguishing time is within 2 seconds for all of 10 specimens.

○: The flame extinguishing time is within 3 seconds for all of 10 specimens.

Δ: The flame extinguishing time is longer than 3 seconds for 1 or more and 3 or less specimens.

X: The flame extinguishing time is longer than 3 seconds for 4 or more specimens.

Example B1

To 100 parts of a polystyrene resin (produced by Nippon Steel Chemical Co., Ltd., trade name: Estyrene G-17, melt index (MI): 3.1), 0.5 part of talc as a nucleating agent, 3.0 parts of hexabromocyclododecane and 2.0 parts of 5,5'-bistetrazole diguanidine salt (produced by Toyo Kasei Kogyo Co., Ltd., BHT-2GAD) (in Table B, abbreviated as tetrazole) as flame retardants, and further 0.25 part of barium stearate were added and dry-blended and then the resultant resin mixture was supplied at a rate of about 40 kg/hr to a two-stage extruder composed of a 65 mm diameter extruder and a 90 mm diameter extruder connected in series. The resin mixture supplied to the foregoing 65 mm diameter extruder was heated to 200° C. to be melted, plasticized and kneaded, and then the resultant was cooled to 120° C. in the 90 mm diameter extruder connected to the former and extruded to the atmospheric air through a die with a rectangular cross section of 2 mm in the thickness direction and 50 mm in the width direction attached to the tip of the 90 mm diameter extruder to obtain an extruded foam having a rectangular parallelepiped shape.

In this case, as blowing agents, isobutane and dimethyl ether were introduced under pressure into the polystyrene resin so that the total amount of isobutane and dimethyl ether was 8 parts based on 100 parts of the polystyrene resin and the proportions of isobutane and dimethyl ether were 50% by weight and 50% by weight, respectively, based on 100% by weight of the total of the blowing agents, through different lines, respectively, at the tip portion of the foregoing 65 mm diameter extruder (the end portion to which the 90 mm diameter extruder was connected at the end opposite to the die of the extruder). The characteristic properties of the obtained foam having a thickness of 45 mm are shown in Table B.

Examples B2, B3, and B4

Extruded foams were obtained in the same conditions as in Example B1 except that the amounts of hexabromocyclododecane and 5,5'-bistetrazole diguanidine salt were changed to those described in Table B. The characteristic properties of the obtained foams are shown in Table B.

Comparative Example B1

An extruded foam was obtained in the same conditions as in Example B1 except that no 5,5'-bistetrazole diguanidine salt was added. The characteristic properties of the obtained foam are shown in Table B.

Comparative Example B2

An extruded foam was obtained in the same conditions as in Example B1 except that no hexabromocyclododecane was added. The characteristic properties of the obtained foam are shown in Table B.

TABLE B

|  | Example | | | | Comparative Example | |
| --- | --- | --- | --- | --- | --- | --- |
|  | B1 | B2 | B3 | B4 | B1 | B2 |
| Amount of blowing agent introduced under pressure (parts) | | | | | | |
| Isobutane | 4 | 4 | 4 | 4 | 4 | 4 |
| DME | 4 | 4 | 4 | 4 | 4 | 4 |
| Amount of flame retardant (carts) | | | | | | |
| HBCD | 3 | 3 | 5 | 3 | 3 | — |
| Tetrazole | 2 | 4 | 2 | 9 | — | 2 |
| Expansion ratio (itmes) | 31 | 31 | 32 | 32 | 32 | 33 |
| Closed cell ratio (%) | 95 | 96 | 95 | 94 | 92 | 90 |
| Average cell size (mm) | 0.25 | 0.22 | 0.23 | 0.20 | 0.29 | 0.29 |

TABLE B-continued

|  | Example | | | | Comparative Example | |
| --- | --- | --- | --- | --- | --- | --- |
|  | B1 | B2 | B3 | B4 | B1 | B2 |
| Amount of remaining blowing agent (g) | | | | | | |
| Isobutane | 3.7 | 3.6 | 3.7 | 3.6 | 3.7 | 3.7 |
| DME | 0.1 | 0.1 | 0.1 | 0.1 | 0.1 | 0.1 |
| Foam appearance | ○ | ○ | ○ | Δ | ○ | ○ |
| Thermal conductivity | ○ | ○ | ○ | ○ | ○ | ○ |
| Combustibility | ○ | ◎ | ◎ | ◎ | X | X |

As being made clear by comparison of Examples B1 to B4 and Comparative Examples B1 and B2, the foams of the present invention obtained by using isobutane as one of saturated hydrocarbons having 3 to 5 carbon atoms and dimethyl ether as other blowing agent and HBCD as a halogenated flame retardant (A) and a tetrazole compound as a flame retardant (B) were found excellent all in the foam appearance, thermal conductivity and flame retardant propery.

Examples C1 to C24 and Comparative Examples C1 to C12

As characteristic properties of foams obtained by Examples C1 to C24 and Comparative Examples C1 to C12 described below, the foam density, the amount of remaining gas, the thermal conductivity, and the combustibility were determined according to the following methods.

1) Foam Density (kg/m³)

The foam density was calculated by the following equation and expressed in terms of unit "kg/m³".

Foam density (g/cm³)=Weight of foam (g)/Volume of foam(cm³)

2) Amount of Remaining Blowing Agent

Fourteen days after the production, a foam was analyzed using a gas chromatograph (GC-14A manufactured by Shimadzu Corporation) to determine the amount of remaining blowing agent (g) based on 100 g of the foam.

3) Thermal Conductivity

The thermal conductivity of a foam was measured according to JIS A 9511. The measurement was carried out for foams 30 days after the production.

4) Combustibility

Using specimens of 10 mm thickness, 200 mm length, and 25 mm width, a combustion test was carried out with n=5 for foams 14 days after the production according to JIS A 9511 and the evaluation was carried out according to the following evaluation criteria.

Combustion Time

◎: The flame extinguishing time is within 3 seconds for all of 5 specimens.

○: The flame extinguishing time is longer than 3 seconds for at least one specimen and within 3 seconds for the remaining 3 or more specimens.

Δ: The flame extinguishing time is longer than 3 seconds for at least 3 specimens and within 3 seconds for the remaining 1 or more specimens.

X: The flame extinguishing time is longer than 3 seconds for all of 5 specimens.

Combustion State

◎: The combustion is stopped within the indicating line of combustion and no combustion of blowing agents is observed.

○: Although the combustion is stopped within the indicating line of combustion limit, combustion of blowing agents is slightly observed.

Δ: Combustion of blowing agents is also observed and combustion spreads beyond the indicating line, however burning does not entirely take place.

X: Combustion of blowing agents is also observed and burning takes place entirely.

5) Small Cell Occupying Area Ratio

The small cell occupying area ratio (the area of cells with a cell size of 0.25 mm or smaller per the area of a section of a foam) was determined as follows. Here, the cell with a cell size of 0.25 mm or smaller means that the diameter of a circle having the same area as the sectional area of the cell is 0.25 mm or smaller.

a) A longitudinal section of a foam is photographed at ×30 magnification by using a scanning electron microscope (manufactured by Hitachi Ltd., model S-450).

b) On the photograph is placed an OHP sheet onto which are copied the parts corresponding to cells having a cell size in the thickness direction of more than 7.5 mm (which corresponds to cells having an actual cell size of more than 0.25 mm) by filling them with a black ink (a first treatment).

c) The image subjected to the first treatment is read by an image processing apparatus (manufactured by PIAS Co., Ltd., model: PIAS-II) and the deep color parts and the light color part, namely, whether a certain part is colored in black or not, are distinguished.

d) Among the deep color parts, parts corresponding to an area of a circle having a diameter of not more than 7.5 mm, namely, parts which have a long diameter in the thickness direction but have only an area not more than that of a circle having a diameter of 7.5 mm are changed to light color, whereby the deep color parts are corrected.

e) The area ratio of parts having a cell size of not more than 7.5 mm (light color parts) to the whole image is determined according to the following formula using "FRACTAREA (area ratio)" which is one of image analysis calculating functions.

Small cell occupying area ratio (%)=(1-area of deep color parts/area of the whole image)×100

6) Specific Viscosity $\eta_{sp}$ of Styrene Resin Composing Each Foam

The specific viscosity was determined by the following procedure.

a) About 1 g of a sample from a foam is put into a test tube with ground stopper and about 30 ml of methyl ethyl ketone is added to dissolve the sample. In case of a sample which is difficult to be dissolved, heating at 60° C. or lower is carried out to sufficiently dissolve the sample.

b) The test tube is stoppered and allowed to stand for 6 hours or longer to precipitate insoluble substances (solid, gel).

c) Thereafter, the supernatant in the test tube is slowly transferred to a beaker of a 100 ml of higher capacity.

d) Ethanol is added by several ml portions while the content of the beaker being stirred using a magnetic stirrer to confirm precipitation of resin. Further ethanol is added by several ml portions and after the precipitated resin is not dissolved again, ethanol is slowly added by several drops to precipitate almost all of the resin component.

e) The precipitated resin component is agglomerated while being mixed by a stirring rod to be precipitated in the bottom of the beaker. While being pushed against the bottom of the beaker, the resin component is lightly washed.

f) After washing, the supernatant in the beaker is discarded and the resin component is put on an aluminum foil and spread in a thin plate.

g) All together with the aluminum foil, the resin component is put in an oven at 70° C. and kept for 12 hours or longer to completely evaporate the solvent.

h) As a sample, 250 mg (precisely weighed) of the dried resin component is put in a test tube with ground stopper and 25 ml (precisely taken with a whole pipette) of toluene is added to dissolve the resin component. In case of a resin component which is difficult to be dissolved, heating at 60° C. or lower is carried out to sufficiently dissolve the resin component.

i) Using 10 ml (precisely taken by a whole pipette) of a sample, a relative viscosity to toluene (guaranteed reagent) is measured at 30° C. by an Ostwald's viscometer (water at 30° C./50S type). The specific viscosity is calculated by the following equation:

Specific viscosity ($\eta_{sp}$)=(sample passing time)/(toluene passing time)−1.

Example C1

To 100 parts of a polystyrene resin (produced by Nippon Steel Chemical Co., Ltd., trade name: Estyrene G-17, melt index (MI): 3.1), 0.5 part of talc as a nucleating agent, 3 parts of hexabromocyclododecane (HBCD) as a halogenated flame retardant and 2 parts of isocyanuric acid (produced by SHIKOKU CORPORATION, trade name: ICA-P, which is non-flammable itself and has a decomposition point of 330° C. and a solubility of 0.3 g/100 g of water at 25° C.), and 0.25 part of barium stearate were dry-blended and then the resultant resin mixture was supplied at a rate of about 40 kg/hr to a two-stage extruder composed of a 65 mm diameter extruder and a 90 mm diameter extruder connected in series. The resin mixture supplied to the foregoing 65 mm diameter extruder was heated to 200° C. to be melted, plasticized and kneaded, and then the resultant was cooled to 120° C. in the 90 mm diameter extruder connected to the former and extruded to the atmospheric air through a die with a rectangular cross section of 2 mm in the thickness direction and 50 mm in the width direction attached to the tip of the 90 mm diameter extruder to obtain an extruded foam having a rectangular parallelepiped shape.

In this case, as blowing agents, 3 parts of isobutane and 3 parts of dimethyl ether based on 100 parts of the polystyrene resin (50% of isobutane and 50% of dimethyl ether based on 100% of the blowing agents), were introduced under pressure into the polystyrene resin through different lines, respectively, at the tip portion of the foregoing 65 mm diameter extruder (the end portion to which the 90 mm diameter extruder was connected at the end opposite to the die of the extruder). The characteristic properties of the obtained foam are shown in Table C1. The foam was provided with flame retardant property significantly improved as compared with those obtained by Comparative Examples C1 to C2 described below.

Example C2

An extruded foam was obtained in the same conditions as in Example C1 except that 4 parts of isobutane and 2 parts of dimethyl ether based on 100 parts of the polystyrene resin (67% of isobutane and 33% of dimethyl ether based on 100% of blowing agents) were introduced and the amount of isocyanuric acid was changed to 3 parts. The characteristic properties of the obtained foam are shown in Table $C_1$. The foam was provided with both of high-level thermal insulation performance and flame retardant property as compared with those obtained by Example C1 or Comparative Examples C1 to C4.

Example C3

An extruded foam was obtained in the same conditions as in Example C1 except that 4.5 parts of isobutane and 1.5 parts of dimethyl ether based on 100 parts of the polystyrene resin (75% of isobutane and 25% of dimethyl ether based on 100% of blowing agents) were introduced and the amount of isocyanuric acid was changed to 4 parts. The characteristic properties of the obtained foam are shown in Table C1. The foam was provided with both of high-level thermal insulation performance and flame retardant property as compared with those obtained by Example C1 or Comparative Examples C1 to C4.

Example C4

An extruded foam was obtained in the same conditions as in Example C2 except that tetrabromobisphenol A type epoxy oligomer (produced by SAKAMOTO YAKUHIN KOGYO CO., LTD., trade name: SR-T5000) was used in place of HBCD. The characteristic properties of the obtained foam are shown in Table C1. The foam was provided with both of thermal insulation performance and flame retardant property just as that of Example C2.

Example C4

An extruded foam was obtained in the same conditions as in Example C2 except that decabromodiphenylethane (produced by Albemarle Asano Corp., trade name: SATEX-8010) was used in place of HBCD. The characteristic properties of the obtained foam are shown in Table C1. The foam was provided with both of thermal insulation performance and flame retardant property just as that of Example C2.

Example C6

An extruded foam was obtained in the same conditions as in Example C2 except that bis(2-caboxyethyl) isocyanurate (produced by SHIKOKU CORPORATION, melting point: 287° to 289° C., solubility: 0.3 g/100 g of water at 20° C.) was used in place of isocyanuric acid. The characteristic properties of the obtained foam are shown in Table C1. The foam was provided with both of thermal insulation performance and flame retardant property just as that of Example C2.

Example C7

An extruded foam was obtained in the same conditions as in Example C3 except that 1 part of triphenyl phosphate as a phosphoric acid ester compound (produced by Daihachi Chemical Industry Co., Ltd., trade name: TPP) was further added to 100 parts of the polystyrene resin. The characteristic properties of the obtained foam are shown in Table C1. The foam was provided with flame retardant property further improved as compared with that of Example C3.

Example C8

An extruded foam was obtained in the same conditions as in Example C3 except that 2 parts of resorcinol-dicresyl phosphate (produced by Asahi Denka Kogyo K.K., trade name: ADEKA Stab FP-500) as a phosphoric acid ester type compound was further added to 100 parts of the polystyrene resin. The characteristic properties of the obtained foam are shown in Table C1. The foam was provided with flame retardant property further improved as compared with that of Example C3.

Example C9

An extruded foam was obtained in the same conditions as in Example C2 except that 4 parts of isobutane (100% of isobutane based on 100% of the blowing agent) was added to 100 parts of the polystyrene resin and the amount of isocyanuric acid was changed to 3 parts. The characteristic properties of the obtained foam are shown in Table C1. Except that an increased foam density, the foam was provided with both of thermal insulation performance and flame retardant property.

Comparative Example C1

An extruded foam was obtained in the same conditions as in Example C2 except that none of HBCD and isocyanuric acid were added. The characteristic properties of the obtained foam are shown in Table C1. The flame retardant property of the foam was deteriorated as compared with that of Example C2.

Comparative Example C2

An extruded foam was obtained in the same conditions as in Example C1 except that isocyanuric acid was not added. The characteristic properties of the obtained foam are shown in Table C1. The flame retardant property of the foam was deteriorated as compared with that of Example C1.

Comparative Example C3

An extruded foam was obtained in the same conditions as in Example C2 except that isocyanuric acid was not added. The characteristic properties of the obtained foam are shown in Table C1. The flame retardant property of the foam was deteriorated as compared with that of Example C2.

Comparative Example C4

An extruded foam was obtained in the same conditions as in Example C2 except that HBCD was not added. The characteristic properties of the obtained foam are shown in Table C1. The flame retardant property of the foam was deteriorated as compared with that of Example C2.

TABLE C1

| | | Example | | | | | | | | | Comparative Example | | | |
|---|---|---|---|---|---|---|---|---|---|---|---|---|---|---|
| | | C1 | C2 | C3 | C4 | C5 | C6 | C7 | C8 | C9 | C1 | C2 | C3 | C4 |
| Polystyrene | Parts | 100 | 100 | 100 | 100 | 100 | 100 | 100 | 100 | 100 | 100 | 100 | 100 | 100 |
| Halogenated flame retardant | | | | | | | | | | | | | | |
| HBCD | Parts | 3 | 3 | 3 | — | — | 3 | 3 | 3 | 3 | — | 3 | 3 | — |
| Tetrabromo-bisphenol A type epoxy oligomer | Parts | — | — | — | 3 | — | — | — | — | — | — | — | — | — |
| Decabromodi-phenylethane | Parts | — | — | — | — | 3 | — | — | — | — | — | — | — | — |
| Nitrogen-containing compound | | | | | | | | | | | | | | |
| Isocyanuric acid | Parts | 2 | 3 | 4 | 3 | 3 | — | 4 | 4 | 3 | — | — | — | 3 |
| Bis(2-carboxyethyl) isocyanurate | Parts | — | — | — | — | — | 3 | — | — | — | — | — | — | — |
| Phosphoric acid ester compound | | | | | | | | | | | | | | |
| Triphenyl phosphate | Parts | — | — | — | — | — | — | 1 | — | — | — | — | — | — |
| Resorcinol-dicresyl phosphate | Parts | — | — | — | — | — | — | — | 2 | — | — | — | — | — |
| Blowing agent | | | | | | | | | | | | | | |
| Isobutane | Parts | 3 | 4 | 4.5 | 4 | 4 | 4 | 4.5 | 4.5 | 4 | 4 | 3 | 4 | 4 |
| Dimethyl ether | Parts | 3 | 2 | 1.5 | 2 | 2 | 2 | 1.5 | 1.5 | — | 2 | 3 | 2 | 2 |
| Foam density | kg/m$^3$ | 30 | 31 | 32 | 31 | 31 | 31 | 31 | 31 | 38 | 30 | 30 | 31 | 31 |
| Amount of remaining blowing agent | | | | | | | | | | | | | | |
| Isobutane | g | 2.8 | 3.9 | 4.3 | 4 | 4 | 4 | 4.4 | 4.3 | 3.9 | 4 | 2.7 | 3.9 | 4 |
| Dimethyl ether | g | 0.3 | 0.1 | 0.2 | 0.1 | 0 | 0.1 | 0.1 | 0.2 | — | 0.1 | 0.4 | 0.1 | 0.1 |
| Thermal conductivity | W/mK | 0.031 | 0.028 | 0.027 | 0.028 | 0.028 | 0.028 | 0.027 | 0.027 | 0.027 | 0.028 | 0.032 | 0.028 | 0.028 |

TABLE C1-continued

|  | Example | | | | | | | | | Comparative Example | | | |
| --- | --- | --- | --- | --- | --- | --- | --- | --- | --- | --- | --- | --- | --- |
|  | C1 | C2 | C3 | C4 | C5 | C6 | C7 | C8 | C9 | C1 | C2 | C3 | C4 |
| Combustibility | | | | | | | | | | | | | |
| Combustion time | ◎ | ◎ | ◎ | ◎ | ◎ | ◎ | ◎ | ◎ | ◎ | × | ○ | △ | × |
| Combustion state | ◎ | ◎ | ○ | ◎ | ◎ | ◎ | ◎ | ◎ | ◎ | × | △ | × | × |

Example C10

To 100 parts of the polystyrene, 0.5 part of talc as a nucleating agent, 3 parts of hexabromocyclododecane (HBCD) as a halogenated flame retardant and 2 parts of isocyanuric acid, and 0.25 part of barium stearate were dry-blended and then the resultant resin mixture was supplied at a rate of about 40 kg/hr to a two-stage extruder composed of a 65 mm diameter extruder and a 90 mm diameter extruder connected in series. The resin mixture supplied to the foregoing 65 mm diameter extruder was heated to 200° C. to be melted, plasticized and kneaded, and then the resultant was cooled to 120° C. in the 90 mm diameter extruder connected to the former and extruded to the atmospheric air through a die with a rectangular cross section of 2 mm in the thickness direction and 50 mm in the width direction attached to the tip of the 90 mm diameter extruder to obtain an extruded foam having a rectangular parallelepiped shape.

In this case, as blowing agents, 3 parts of isobutane and 5 parts of methyl chloride based on 100 parts of the polystyrene resin (37.5% of isobutane and 62.5% of methyl chloride based on 100% of the blowing agents) were introduced under pressure into the polystyrene resin through different lines, respectively, at the tip portion of the foregoing 65 mm diameter extruder (the end portion to which the 90 diameter as connected at the end opposite to the die of the extruder). The characteristic properties of the obtained foam are shown in Table C2. The foam was provided with flame retardant property significantly improved as compared with those obtained by Comparative Examples C5 to C8 described below.

Example C11

An extruded foam was obtained in the same conditions as in Example C10 except that 4 parts of isobutane and 4 parts of methyl chloride based on 100 parts of the polystyrene resin (50% of isobutane and 50% of methyl chloride based on 100% of blowing agents) were introduced and the amount of isocyanuric acid was changed to 3 parts. The characteristic properties of the obtained foam are shown in Table C2. The foam was further improved in thermal insulation property as compared with that obtained by Example C10 and provided with both of thermal insulation property and flame retardant property as compared with those obtained by Example C10 or Comparative Examples C5 to C8.

Example C12

An extruded foam was obtained in the same conditions as in Example C10 except that 5 parts of isobutane and 3 parts of methyl chloride based on 100 parts of the polystyrene resin (62.5% of isobutane and 37.5% of methyl chloride based on 100% of blowing agents) were introduced and the amount of isocyanuric acid was changed to 4 parts. The characteristic properties of the obtained foam are shown in Table C2. The foam was further improved in thermal insulation property as compared with those obtained by Example C10 or Comparative Examples C5 to C8 and provided with both of thermal insulation property and flame retardant property.

Example C13

An extruded foam was obtained in the same conditions as in Example C11 except that tetrabromobisphenol A type epoxy oligomer was used in place of HBCD. The characteristic properties of the obtained foam are shown in Table C2. The foam was provided with both of thermal insulation performance and flame retardant property just as that of Example C11.

Example C14

An extruded foam was obtained in the same conditions as in Example C11 except that decabromodiphenylethane was used in place of HBCD. The characteristic properties of the obtained foam are shown in Table C2. The foam was provided with both of thermal insulation performance and flame retardant property just as that of Example C11.

Example C15

An extruded foam was obtained in the same conditions as in Example C11 except that bis(2-caboxyethyl) isocyanurate was used in place of isocyanuric acid. The characteristic properties of the obtained foam are shown in Table C2. The foam was provided with both of thermal insulation performance and flame retardant property just as that of Example C11.

Example C16

An extruded foam was obtained in the same conditions as in Example C12 except that 1 part of triphenyl phosphate as a phosphoric acid ester compound was further added to 100 parts of the polystyrene resin. The characteristic properties of the obtained foam are shown in Table C2. The foam was provided with flame retardant property further improved as compared with that of Example C12.

Comparative Example C5

An extruded foam was obtained in the same conditions as in Example C11 except that none of HBCD and isocyanuric acid were added. The characteristic properties of the obtained foam are shown in Table C2. The flame retardant property of the foam was deteriorated as compared with that of Example C11.

Comparative Example C6

An extruded foam was obtained in the same conditions as in Example C11 except that isocyanuric acid was not added.

The characteristic properties of the obtained foam are shown in Table C2. The flame retardant property of the foam was deteriorated as compared with that of Example C11.

Comparative Example C7

An extruded foam was obtained in the same conditions as in Example C10 except that isocyanuric acid was not added. The characteristic properties of the obtained foam are shown in Table C2. The flame retardant property of the foam was deteriorated as compared with that of Example C10.

Comparative Example C8

An extruded foam was obtained in the same conditions as in Example C11 except that HBCD was not added. The characteristic properties of the obtained foam are shown in Table C2. The flame retardant property of the foam was deteriorated as compared with that of Example C11.

width direction attached to the tip of the 90 mm diameter extruder to obtain an extruded foam having a rectangular parallelepiped shape.

In this case, as blowing agents, 3 parts of isobutane, 3 parts of dimethyl ether and 1 part of water based on 100 parts of the polystyrene resin (43% of isobutane, 43% of dimethyl ether and 14% of water based on 100% of the blowing agents) were introduced under pressure into the polystyrene resin through different lines, respectively, at the tip portion of the foregoing 65 mm diameter extruder (the end portion to which the 90 mm diameter extruder was connected at the end opposite to the die of the extruder).

In the obtained foam, small cells and large cells were formed to exit together and the small cell area ratio was 45%. The characteristic properties of the obtained foam are shown in Table C3. The results of Examples C1 and C2 are also shown in Table C3. The foam was provided with flame retardant property significantly improved as compared with

TABLE C2

| | | Example | | | | | | | Comparative Example | | | |
|---|---|---|---|---|---|---|---|---|---|---|---|---|
| | | C10 | C11 | C12 | C13 | C14 | C15 | C16 | C5 | C6 | C7 | C8 |
| Polystyrene | Parts | 100 | 100 | 100 | 100 | 100 | 100 | 100 | 100 | 100 | 100 | 100 |
| Halogenated flame retardant | | | | | | | | | | | | |
| HBCD | Parts | 3 | 3 | 3 | — | — | 3 | 3 | — | 3 | 3 | — |
| Tetrabromobisphenol A type epoxy oligomer | Parts | — | — | — | 3 | — | — | — | — | — | — | — |
| Decabromodiphenylethane | Parts | — | — | — | — | 3 | — | — | — | — | — | — |
| Nitrogen-containing compound | | | | | | | | | | | | |
| Isocyanuric acid | Parts | 2 | 3 | 4 | 3 | 3 | — | 4 | — | — | — | 3 |
| Bis(2-carboxyethyl) isocyanurate | Parts | — | — | — | — | — | 3 | — | — | — | — | — |
| Phosphoric acid ester compound | Parts | — | — | — | — | — | — | 1 | — | — | — | — |
| Triphenyl phosphate | | | | | | | | | | | | |
| Blowing agent | | | | | | | | | | | | |
| Isobutane | Parts | 3 | 4 | 5 | 4 | 4 | 4 | 5 | 4 | 3 | 4 | 4 |
| Methyl chloride | Parts | 5 | 4 | 3 | 4 | 4 | 4 | 3 | 4 | 5 | 4 | 4 |
| Foam density | kg/m³ | 27 | 28 | 29 | 28 | 28 | 28 | 29 | 28 | 28 | 28 | 28 |
| Amount of remaining blowing agent Isobutane | g | 2.8 | 3.9 | 4.8 | 3.8 | 3.8 | 3.9 | 4.7 | 3.9 | 2.8 | 3.9 | 3.8 |
| Thermal conductivity | W/mK | 0.033 | 0.031 | 0.029 | 0.031 | 0.031 | 0.031 | 0.029 | 0.031 | 0.033 | 0.031 | 0.031 |
| Combustibility | | | | | | | | | | | | |
| Combustion time | | ⊚ | ⊚ | ⊚ | ⊚ | ⊚ | ⊚ | ⊚ | X | ○ | Δ | X |
| Combustion state | | ⊚ | ⊚ | ○ | ⊚ | ⊚ | ⊚ | ⊚ | X | Δ | X | X |

Example C17

To 100 parts of the polystyrene resin, 1 part of bentonite (produced by HOJUN KOGYO CO., LTD., trade name: BENGEL 15), 0.1 part of dehydrated silica (produced by Nippon Aerosil Co., Ltd., trade name: AEROSIL) as an inorganic powder having a large number of hydroxyl groups, 0.1 part of talc as a nucleating agent, 3 parts of hexabromocyclododecane (HBCD) as a halogenated flame retardant, 2 parts of isocyanuric acid, and 0.25 part of barium stearate were dry-blended and then the resultant resin mixture was supplied at a rate of about 40 kg/hr to a two-stage extruder composed of a 65 mm diameter extruder mm and a 90 mm diameter extruder connected in series. The resin mixture supplied to the foregoing 65 mm diameter extruder was heated to 200° C. to be melted, plasticized and kneaded, and then the resultant was cooled to 120° C. in the 90 mm diameter extruder connected to the former and extruded to the atmospheric air through a die with a rectangular cross section of 2 mm in the thickness direction and 50 mm in the those obtained by the following Comparative Examples C9 to C12. Further, the heat insulation property thereof was also considerably improved as compared with that of Example C1.

Example C18

An extruded foam was obtained in the same conditions as in Example C17 except that 4 parts of isobutane, 2 parts of dimethyl ether, and 1 part of water based on 100 parts of the polystyrene resin (57% of isobutane, 29% of dimethyl ether, and 14% of water based on 100% of the blowing agents) were introduced and the amount of isocyanuric acid was changed to 3 parts. In the obtained foam, small cells and large cells were formed to exit together and the small cell area ratio was 45%. The characteristic properties of the obtained foam are shown in Table C3. The foam was provided with flame retardant property significantly improved as compared with those obtained by the following Comparative Examples C9 to C12. Further, the heat insulation property thereof was also considerably improved as compared with that of Example C2 or Example C17. That is, the extruded styrene resin foam had both of thermal insulation property and flame retardant property meeting thermal insulating board No.3 of extruded polystyrene foam prescribed in JIS A 9511.

Example C19

An extruded foam was obtained in the same conditions as in Example C17 except that 4.5 parts of isobutane, 1.5 parts of dimethyl ether, and 1 part of water based on 100 parts of the polystyrene resin (64.3% of isobutane, 21.4% of dimethyl ether, and 14.3% of water based on 100% of the blowing agents) were introduced and the amount of isocyanuric acid was changed to 4 parts. In the obtained foam, the small cell area ratio was 40%. The characteristic properties of the obtained foam are shown in Table C3. The foam was provided with thermal insulation property improved as compared with that of Example C18 and further excellent flame retardant property.

Example C20

An extruded foam was obtained in the same conditions as in Example C18 except that tetrabromobisphenol A type epoxy oligomer was used in place of HBCD. The characteristic properties of the obtained foam are shown in Table C3. The obtained foam was provided with excellent thermal insulation property and flame retardant property just as those of Example C18. That is, the extruded styrene resin foam had both of thermal insulation property and flame retardant property meeting thermal insulating board No.3 of extruded polystyrene foam prescribed in JIS A 9511.

Example C21

An extruded foam was obtained in the same conditions as in Example C18 except that decabromodiphenylethane was used in place of HBCD. The characteristic properties of the obtained foam are shown in Table C3. The obtained foam was provided with excellent thermal insulation property and flame retardant property just as those of Example C18. That is, the extruded styrene resin foam had both of thermal insulation property and flame retardant property meeting thermal insulating board No.3 of extruded polystyrene foam prescribed in JIS A 9511.

Example C22

An extruded foam was obtained in the same conditions as in Example C18 except that bis(2-carboxyethyl) isocyanurate was used in place of isocyanuric acid. The characteristic properties of the obtained foam are shown in Table C3. The obtained foam was provided with excellent thermal insulation property and flame retardant property just as those of Example C18. That is, the extruded styrene resin foam had both of thermal insulation property and flame retardant property meeting thermal insulating board No.3 of extruded polystyrene foam prescribed in JIS A 9511.

Example C23

An extruded foam was obtained in the same conditions as in Example C19 except that 1 part of triphenyl phosphate (produced by Daihachi Chemical Industry Co., Ltd., trade name: TPP) as a phosphoric acid ester compound was further added to 100 parts of the polystyrene resin. The characteristic properties of the obtained foam are shown in Table C3. The obtained foam was provided with flame retardant property further improved as compared with that of Example C19. That is, the extruded styrene resin foam had both of thermal insulation property and flame retardant property meeting thermal insulating board No.3 of extruded polystyrene foam prescribed in JIS A 9511.

Example C24

An extruded foam was obtained in the same conditions as in Example C18 except that 4 parts of isobutane and 1 part of water based on 100 parts of the polystyrene resin (80% of isobutane and 20% of water based on 100% of the blowing agents) was introduced and the amount of isocyanuric acid was changed to 3 parts. The characteristic properties of the obtained foam are shown in Table C3. Except an increased foam density, the obtained foam was provided with both of excellent thermal insulation property and flame retardant property. That is, the extruded styrene resin foam had both of thermal insulation property and flame retardant property meeting thermal insulating board No.3 of extruded polystyrene foam prescribed in JIS A 9511.

Comparative Example C9

An extruded foam was obtained in the same conditions as in Example C18 except that none of HBCD and isocyanuric acid were added. The characteristic properties of the obtained foam are shown in Table C3. The flame retardant property of the foam was deteriorated as compared with that of Example C18.

Comparative Example C10

An extruded foam was obtained in the same conditions as in Example C17 except that isocyanuric acid was not added. The characteristic properties of the obtained foam are shown in Table C3. The flame retardant property of the foam was deteriorated as compared with that of Example C17.

Comparative Example C11

An extruded foam was obtained in the same conditions as in Example C18 except that isocyanuric acid was not added. The characteristic properties of the obtained foam are shown in Table C3. The flame retardant property of the foam was deteriorated as compared with that of Example C18.

Comparative Example C12

An extruded foam was obtained in the same conditions as in Example C18 except that HBCD was not added. The characteristic properties of the obtained foam are shown in Table C3. The flame retardant property of the foam was deteriorated as compared with that of Example C18.

TABLE C3

| | | Example | | | | | | | | | |
|---|---|---|---|---|---|---|---|---|---|---|---|
| | | C1 | C2 | C17 | C18 | C19 | C20 | C21 | C22 | C23 | C24 |
| Polystyrene | Parts | 100 | 100 | 100 | 100 | 100 | 100 | 100 | 100 | 100 | 100 |
| Halogenated flame retardant | | | | | | | | | | | |
| HBCD | Parts | 3 | 3 | 3 | 3 | 3 | — | — | 3 | 3 | 3 |
| Tetrabromobisphenol A type epoxy oligomer | Parts | — | — | — | — | — | 3 | — | — | — | — |
| Decabromodiphenylethane | Parts | — | — | — | — | — | — | 3 | — | — | — |
| Nitrogen-containing compound | | | | | | | | | | | |
| Isocyanuric acid | Parts | 2 | 3 | 2 | 3 | 4 | 3 | 3 | — | 4 | 3 |
| Bis(2-carboxyethyl) isocyanurate | Parts | — | — | — | — | — | — | — | 3 | — | — |
| Phosphoric acid ester compound | Parts | — | — | — | — | — | — | — | — | 1 | — |
| Triphenyl phosphate | | | | | | | | | | | |
| Blowing agent | | | | | | | | | | | |
| Isobutane | Parts | 3 | 4 | 3 | 4 | 4.5 | 4 | 4 | 4 | 4.5 | 4 |
| Dimethyl ether | Parts | 3 | 2 | 3 | 2 | 1.5 | 2 | 2 | 2 | 1.5 | — |
| Water | Parts | — | — | 1 | 1 | 1 | 1 | 1 | 1 | 1 | 1 |
| Other additive | | | | | | | | | | | |
| Bentonite | Parts | — | — | 1 | 1 | 1 | 1 | 1 | 1 | 1 | 1 |
| AEROSIL | Parts | — | — | 0.1 | 0.1 | 0.1 | 0.1 | 0.1 | 0.1 | 0.1 | 0.1 |
| Foam density | kg/m$^3$ | 30 | 31 | 30 | 31 | 33 | 31 | 31 | 31 | 31 | 36 |
| $\eta_{sp}$ of foam | | 0.92 | 0.94 | 0.89 | 0.93 | 0.92 | 0.94 | 0.88 | 0.93 | 0.91 | 0.88 |
| Amount of remaining blowing agent | | | | | | | | | | | |
| Isobutane | g | 2.8 | 3.9 | 2.8 | 3.8 | 4.4 | 3.8 | 4 | 4 | 4.3 | 3.9 |
| Dimethyl ether | g | 0.3 | 0.1 | 0.3 | 0 | 0 | 0 | 0 | 0 | 0 | 0 |
| Small cell area ratio | % | 0 | 0 | 45 | 45 | 40 | 45 | 45 | 45 | 40 | 45 |
| Thermal conductivity | W/ml | 0.031 | 0.028 | 0.029 | 0.027 | 0.026 | 0.026 | 0.027 | 0.027 | 0.027 | 0.026 |
| Combustibility | | | | | | | | | | | |
| Combustion time | | ◎ | ◎ | ◎ | ◎ | ◎ | ◎ | ◎ | ◎ | ◎ | ◎ |
| Combustion state | | ◎ | ◎ | ◎ | ◎ | ○ | ◎ | ◎ | ◎ | ◎ | ◎ |

| | Comparative Example | | | |
|---|---|---|---|---|
| | C9 | C10 | C11 | C12 |
| Polystyrene | 100 | 100 | 100 | 100 |
| Halogenated flame retardant | | | | |
| HBCD | — | 3 | 3 | — |
| Tetrabromobisphenol A type epoxy oligomer | — | — | — | — |
| Decabromodiphenylethane | — | — | — | — |
| Nitrogen-containing compound | | | | |
| Isocyanuric acid | — | — | — | 3 |
| Bis(2-carboxyethyl) isocyanurate | — | — | — | — |
| Phosphoric acid ester compound | — | — | — | — |
| Triphenyl phosphate | | | | |
| Blowing agent | | | | |
| Isobutane | 4 | 3 | 4 | 4 |
| Dimethyl ether | 2 | 3 | 2 | 2 |
| Water | 1 | 1 | 1 | 1 |
| Other additive | | | | |
| Bentonite | 1 | 1 | 1 | 1 |
| AEROSIL | 0.1 | 0.1 | 0.1 | 0.1 |
| Foam density | 31 | 31 | 31 | 31 |
| $\eta_{sp}$ of foam | 0.93 | 0.92 | 0.88 | 0.91 |
| Amount of remaining blowing agent | | | | |
| Isobutane | 3.8 | 2.9 | 3.8 | 3.9 |
| Dimethyl ether | 0 | 0.2 | 0 | 0 |
| Small cell area ratio | 45 | 45 | 45 | 45 |
| Thermal conductivity | 0.027 | 0.029 | 0.027 | 0.027 |
| Combustibility | | | | |
| Combustion time | X | ○ | Δ | X |
| Combustion state | X | Δ | X | X |

Examples D1 to D5 and Comparative Examples D1 to D5

In the description hereinafter, the following abbreviated symbols denote the following substances, respectively.

DME: Dimethyl ether
HBCD: Hexabromocyclododecane
St-Ba: Barium stearate

As characteristic properties of foams obtained by Examples D1 to D5 and Comparative Examples D1 to D5 described below, the expansion ratio, the closed cell ratio, the average cell size, the amount of remaining blowing agent, the foam appearance, the foam color, the thermal conductivity and the combustibility were determined according to the following methods.

1) Expansion Ratio

An approximate density of styrene resin was assumed to be 1.05 (g/cm$^3$) and the expansion ratio was calculated by the following equation:

Expansion ratio (times)=1.05/(foam density) (g/cm$^3$)

2) Closed Cell Ratio

Using a multi-pycnometer (manufactured by Beckman Japan Co., Ltd.), the closed cell ratio was measured according to ASTM D-2856.

3) Average Cell Size

A longitudinal section of each extruded foam was photographed at ×30 magnification with a scanning electron microscope (manufactured by Hitachi, Ltd., S-450), and the obtained photograph was copied with a dry type copying machine. The obtained copy was subjected to a first treatment of filling parts to corresponding to cells with a black ink, and the image obtained by the first treatment was subjected to processing with an image processing apparatus (manufactured by PIAS Co., Ltd., PIAS-II) to determine the average cell size.

4) Amount of Remaining Blowing Agent

Twenty days after the production, a foam was analyzed using a gas chromatograph (GC-9A manufactured by Shimadzu Corporation) to determine the amount of remaining blowing agent (g) based on 100 g of the foam. In the analysis, isobutane and DME were set to be objects to be analyzed.

5) Foam Appearance

The appearance of a foam was evaluated according to the following evaluation criteria.

○: No unfoamed resin parts and no voids are found in the section and wrinkling and projection are scarcely found on the surface.

Δ: A small number of unfoamed resin parts and voids exist in the section, and/or, a small number of wrinkling and projections exist on the surface.

X: A large number of unfoamed resin parts and voids exist in the section, and/or, wrinkling and projections considerably exist on the surface.

6) Foam Color

The color of a foam was evaluated by the naked eye.

7) Thermal conductivity

The thermal conductivity of a foam was measured according to JIS A 9511 and the evaluation was carried out according to the following evaluation criteria. The measurement was carried out for foams 20 days after the production.

◎: Thermal conductivity is lower than 0.027 W/mK.
○: Thermal conductivity is not lower than 0.027 W/mK and lower than 0.028 W/mK.
Δ: Thermal conductivity is not lower than 0.028 W/mK and lower than 0.029 W/mK.
X: Thermal conductivity is not lower than 0.029 W/mK.

8) Combustibility

Using specimens each having a thickness of 10 mm, a length of 200 mm and a width of 25 mm, a combustion test was carried out with n=10 according to JIS A 9511 and the combustibility was evaluated in terms of flame extinguishing time according to the following evaluation criteria. The measurement was carried out for foams 20 days after the production.

◎: The flame extinguishing time is within 2 seconds for all of 10 specimens.
○: The flame extinguishing time is within 3 seconds for all of 10 specimens.
Δ: The flame extinguishing time is longer than 3 seconds for 1 or more and 3 or less specimens.
X: The flame extinguishing time is longer than 3 seconds for 4 or more specimens.

Example D1

To 100 parts of a polystyrene resin (produced by Nippon Steel Chemical Co., Ltd., Estyrene G-17, melt index (MI): 3.1), 0.5 part of talc as a nucleating agent, 3.0 parts of hexabromocyclododecane (produced by ALBEMARLE CORPORATION, SAYTEX HBCD-LM) and 2.0 parts of zinc borate (produced by US BORAX Co., Fire Break ZB) as flame retardants, and further 0.25 part of barium stearate were dry-blended and then the resultant resin mixture was supplied at a rate of about 40 kg/hr to a two-stage extruder composed of a 65 mm diameter extruder and a 90 mm diameter extruder connected in series.

The resin mixture supplied to the foregoing extruder with an inner diameter of 65 mm was heated to 200° C. to be melted, plasticized and kneaded, and then the resultant was cooled to 120° C. in the 90 mm diameter extruder connected to the former and extruded to the atmospheric air through a die with a rectangular cross section of 2 mm in the thickness direction and 50 mm in the width direction attached to the tip of the 90 mm diameter extruder to obtain an extruded foam having a rectangular parallelepiped shape.

In this case, as blowing agents, isobutane and DME were introduced under pressure into the polystyrene resin so that the total amount of isobutane and DME was 8 parts based on 100 parts of the polystyrene resin and the proportions of isobutane and dimethyl ether were 50% by weight and 50% by weight, respectively, based on 100% by weight of the total of the blowing agents, through different lines, respectively, at the tip portion of the foregoing 65 mm diameter extruder (the end portion to which the 90 mm diameter extruder was connected at the end opposite to the die of the extruder). The characteristic properties of the obtained foam are shown in Table D1.

Example D2

An extruded foam was obtained in the same conditions as in Example D1 except that the amounts of the respective blowing agents were changed to those described in Table D1. The characteristic properties of the obtained foam are shown in Table D1.

Examples D3, D4

Extruded foams were obtained in the same conditions as in Example D1 except that the amount of zinc borate was changed to that described in Table D1. The characteristic properties of the obtained foams are shown in Table D1.

Example D5

An extruded foam was obtained in the same conditions as in Example D1 except that no barium stearate was used. The characteristic properties of the obtained foam are shown in Table D1.

Comparative Example D1

An extruded foam was obtained in the same conditions as in Example D1 except that no hexabromocyclododecane was added. The characteristic properties of the obtained foam are shown in Table D2.

Comparative Example D2

An extruded foam was obtained in the same conditions as in Example D1 except that no zinc borate was added. The characteristic properties of the obtained foam are shown in Table D2.

Comparative Example D3

An extruded foam was obtained in the same conditions as in Example D1 except that none of zinc borate and barium stearate were added. The characteristic properties of the obtained foam are shown in Table D2.

Comparative Example D4

An extruded foam was obtained in the same conditions as in Example D1 except that none of hexabromocyclododecane and barium stearate were added. The characteristic properties of the obtained foam are shown in Table D2.

Comparative Example D5

An extruded foam was obtained in the same conditions as in Example D1 except that none of hexabromocyclododecane and zinc borate were added. The characteristic properties of the obtained foam are shown in Table D2.

TABLE D1

| | Example D1 | D2 | D3 | D4 | D5 |
|---|---|---|---|---|---|
| Amount of blowing agent introduced under pressure (parts) | | | | | |
| Isobutane | 4 | 3 | 4 | 4 | 4 |
| DME | 4 | 5 | 4 | 4 | 4 |
| Halogenated flame retardant (parts) HBCD | 3 | 3 | 3 | 3 | 3 |
| Metal borate (parts) Zinc borate | 2 | 2 | 5 | 8 | 2 |
| Aliphatic acid metal salt (parts) St-Ba | 0.25 | 0.25 | 0.25 | 0.25 | — |
| Expansion ratio (times) | 31 | 32 | 30 | 32 | 30 |
| Closed cell ratio (%) | 91 | 95 | 90 | 88 | 89 |
| Average cell size (mm) | 0.25 | 0.23 | 0.22 | 0.22 | 0.29 |
| Amount of remaining blowing agent (g) | | | | | |
| Isobutane | 3.6 | 2.7 | 3.4 | 3.1 | 3.5 |
| DME | 0.1 | 0.2 | 0.1 | 0.1 | 0.2 |
| Foam appearance | ◯ | ◯ | ◯ | Δ | ◯ |
| Foam color | Gray | Gray | Gray | Gray | White |
| Thermal conductivity | ⊙ | ◯ | ◯ | ◯ | Δ |
| Combustibility | ◯ | ⊙ | ◯ | ◯ | Δ |

TABLE D2

| | Comparative Example D1 | D2 | D3 | D4 | D5 |
|---|---|---|---|---|---|
| Amount of blowing agent introduced under pressure (parts) | | | | | |
| Isobutane | 4 | 4 | 4 | 4 | 4 |
| DME | 4 | 4 | 4 | 4 | 4 |
| Halogenated flame retardant (parts) HBCD | — | 3 | 3 | — | — |
| Metal borate (parts) Zinc borate | 2 | — | — | 2 | — |
| Aliphatic acid metal salt (parts) St-Ba | 0.25 | 0.25 | — | — | 0.25 |
| Expansion ratio (times) | 31 | 32 | 31 | 30 | 30 |
| Closed cell ratio (%) | 90 | 92 | 91 | 90 | 90 |
| Average cell size (mm) | 0.28 | 0.29 | 0.28 | 0.28 | 0.29 |
| Amount of remaining blowing agent (g) | | | | | |
| Isobutane | 3.6 | 3.7 | 3.6 | 3.6 | 3.5 |
| DME | 0.1 | 0.1 | 0.1 | 0.1 | 0.1 |
| Foam appearance | ◯ | ◯ | Δ | Δ | ◯ |
| Foam color | White | White | White | White | White |
| Thermal conductivity | ◯ | ◯ | ◯ | ◯ | ◯ |
| Combustibility | X | X | X | X | X |

As being made clear by comparison of Examples D1 to D4 with Comparative Examples D1 to D5, the foams of the present invention obtained by using isobutane as one of saturated hydrocarbons having 3 to 5 carbon atoms, dimethyl ether as other blowing agent, HBCD as a halogenated flame retardant, zinc borate as a flame retardant B, and further barium stearate were found excellent all in the foam appearance, thermal conductivity, and flame retardant property.

Further, as being made clear by comparison of Example D1 with Example D5, the foam of the present invention obtained by using barium stearate was found excellent in the thermal conductivity as compared with that in case of using no barium stearate.

Examples E1 to E6 and Comparative Examples E1 to E3

As the characteristic properties of each foam obtained by Examples E1 to E6 and Comparative Examples E1 to E3 described below, the expansion ratio, the closed cell ratio, the amount of remaining blowing agent, the thermal conductivity and the combustibility were determinated according to the following methods.

1) Expansion Ratio

An approximate density of styrene resin was assumed to be 1.05 (g/cm$^3$) and the expansion ratio was calculated by the following equation:

Expansion ratio (times)=1.05/(foam density) (g/cm$^3$).

2) Closed Cell Ratio

Using a multi-pycnometer (manufactured by Beckman Japan Co., Ltd.), the closed cell ratio was measured according to ASTM D-2856.

3) Amount of Remaining Blowing Agent

Fourteen days after the production, a foam was analyzed using a gas chromatograph (GC-14A manufactured by Shimadzu Corporation) to determine the amount of remaining blowing agent based on 100 g of the foam.

4) Thermal Conductivity

The thermal conductivity of a foam was measured according to JIS A 9511 and the evaluation was carried out according to the following evaluation criteria. The measurement was carried out for foams 14 days after the production.

○: Thermal conductivity is lower than 0.029 W/mK.

X: Thermal conductivity is not lower than 0.029 W/mK.

5) Combustibility

Using specimens each having a thickness of 10 mm, a length of 200 mm and a width of 25 mm taken from foams 14 days after the production, a combustion test was carried out with n=5 according to JIS A 9511 and the combustibility was evaluated in terms of flame extinguishing time according to the following evaluation criteria.

◎: The flame extinguishing time is within 3 seconds for all of 5 specimens.

○: Although the flame extinguishing time for the resin is within 3 seconds for all of 5 specimens, some combustion of the blowing agent is observed.

Δ: Although the flame extinguishing time for the resin is within 3 seconds for all of 5 specimens, combustion of the blowing agent is observed over the entire specimen.

X: The flame extinguishing time is longer than 3 seconds.

Example E1

To 100 parts of a polystyrene resin (produced by Nippon Steel Chemical Co., Ltd., Estyrene G-17, melt index (MI): 3.1), 0.5 part of talc as a nucleating agent, 3.0 parts of hexabromocyclododecane (HBCD) as a halogenated flame retardant and 2.0 parts of diboron trioxide (produced by US BORAX Co., Boric Oxide), and further 0.25 part of barium stearate were dry-blended and then the resultant resin mixture was supplied at a rate of about 40 kg/hr to a two-stage extruder composed of a 65 mm diameter extruder and a 90 mm diameter extruder connected in series. The resin mixture supplied to the foregoing 65 mm diameter extruder was heated to 200° C. to be melted, plasticized and kneaded, and then the resultant was cooled to 120° C. in the 90 mm diameter extruder connected to the former and extruded to the atmospheric air through a die with a rectangular cross section of 2 mm in the thickness direction and 50 mm in the width direction attached to the tip of the 90 mm diameter extruder to obtain an extruded foam having a rectangular parallelepiped shape.

In this case, as blowing agents, isobutane and dimethyl ether were introduced under pressure into the polystyrene resin so that the total amount of isobutane and dimethyl ether was 8 parts based on 100 parts of the polystyrene resin and the proportions of isobutane and dimethyl ether were 50% by weight and 50% by weight, respectively, based on 100% by weight of the total of the blowing agents, through different lines, respectively, at the tip portion of the foregoing 65 mm diameter extruder (the end portion to which the 90 mm diameter extruder was connected at the end opposite to the die of the extruder). The characteristic properties of the obtained foam are shown in Table E1.

Examples E2 to E4

Extruded foams were obtained in the same conditions as in Example E1 except that the amount of diboron trioxide and the amounts of the respective blowing agents were changed to those described in Table E1. The characteristic properties of the obtained foams are shown in Table E1.

Example E5

An extruded foam was obtained in the same conditions as in Example E1 except that tetrabromobisphenol A type epoxy oligomer was used in place of HBCD. The characteristic properties of the obtained foam are shown in Table E1.

Example E6

An extruded foam was obtained in the same conditions as in Example E1 except that decabromodiphenylethane was used in place of HBCD. The characteristic properties of the obtained foam are shown in Table E1.

Comparative Example E1

An extruded foam was obtained in the same conditions as in Example E1 except that none of HBCD and diboron trioxide were added. The characteristic properties of the obtained foam are shown in Table E2.

Comparative Example E2

An extruded foam was obtained in the same conditions as in Example E1 except that no diboron trioxide was added. The characteristic properties of the obtained foam are shown in Table E2.

Comparative Example E3

An extruded foam was obtained in the same conditions as in Example E1 except that no HBCD was added. The characteristic properties of the obtained foam are shown in Table E2.

TABLE E1

|  |  | E1 | E2 | E3 | E4 | E5 | E6 |
|---|---|---|---|---|---|---|---|
| Polystyrene | Parts | 100 | 100 | 100 | 100 | 100 | 100 |
| Halogenated flame retardant |  |  |  |  |  |  |  |
| HBCD | Parts | 3 | 3 | 3 | 3 | — | — |
| Tetrabromobisphenol A type epoxy oligomer | Parts | — | — | — | — | 3 | — |
| Decabromodiphenylethane | Parts | — | — | — | — | — | 3 |
| Diboron trioxide | Parts | 2 | 5 | 5 | 1 | 2 | 2 |
| Blowing agent |  |  |  |  |  |  |  |
| Isobutane | Parts | 4 | 6 | 8 | 3 | 4 | 4 |
| Dimethyl ether | Parts | 4 | 2 | — | 5 | 4 | 4 |
| Expansion ratio | Times | 33 | 30 | 29 | 33 | 33 | 33 |
| Closed cell ratio | % | 96 | 95 | 94 | 96 | 96 | 96 |
| Amount of remaining blowing agent |  |  |  |  |  |  |  |
| Isobutane | g | 3.8 | 5.5 | 7.1 | 2.6 | 3.7 | 3.8 |
| Dimethyl ether | g | 0.3 | 0.1 | — | 0.4 | 0.2 | 0.2 |
| Thermal conductivity |  | ○ | ○ | ○ | ○ | ○ | ○ |
| Combustibility |  | ◎ | ◎ | ○ | ◎ | ◎ | ◎ |

TABLE E2

|  |  | Comparative Example | | |
|---|---|---|---|---|
|  |  | E1 | E2 | E3 |
| Polystyrene | Parts | 100 | 100 | 100 |
| Halogenated flame retardant |  |  |  |  |
| HBCD | Parts | — | 3 | — |
| Diboron trioxide | Parts | — | — | 2 |
| Blowing agent |  |  |  |  |
| Isobutane | Parts | 4 | 4 | 4 |
| Dimethyl ether | Parts | 4 | 4 | 4 |
| Expansion ratio | Times | 34 | 33 | 34 |
| Closed cell ratio | % | 98 | 96 | 97 |
| Amount of remaining blowing agent |  |  |  |  |
| Isobutane | g | 3.8 | 3.7 | 3.8 |
| Dimethyl ether | g | 0.2 | 0.2 | 0.2 |
| Thermal conductivity |  | ○ | ○ | ○ |
| Combustibility |  | X | Δ | X |

As being made clear by comparison of Examples E1 to E6 with Comparative Examples E1 to E3, the foams of the present invention obtained by using isobutane as one of saturated hydrocarbons having 3 to 5 carbon atoms, dimethyl ether as other blowing agent, HBCD or the like as a halogenated flame retardant, and boron oxide as a flame retardant B were found excellent in the thermal conductivity and flame retardant property.

Examples F1 to F6 and Comparative Examples F1 to F3

As the characteristic properties of each foam obtained by Examples F1 to F6 and Comparative Examples F1 to F3 described below, the expansion ratio, the closed cell ratio, the amount of remaining blowing agent, the thermal conductivity, and the combustibility were determined according to the following methods.

1) Expansion Ratio

An approximate density of styrene resin was assumed to be 1.05 (g/cm³) and the expansion ratio was calculated by the following equation:

Expansion ratio (times)=1.05/(foam density) (g/cm³)

2) Closed Cell Ratio

Using a multi-pycnometer (manufactured by Beckman Japan Co., Ltd.), the closed cell ratio was measured according to ASTM D-2856.

3) Amount of Remaining Blowing Agent

Fourteen days after the production, a foam was analyzed using a gas chromatograph (manufactured by Hitachi, Ltd., S-450) to determine the amount (g) of remaining blowing agent based on 100 g of the foam.

4) Thermal Conductivity

The thermal conductivity of a foam was measured according to JIS A 9511 and the evaluation was carried out according to the following evaluation criteria. The measurement was carried out for foams 14 days after the production.

○: Thermal conductivity is lower than 0.034 W/mK.

X: Thermal conductivity is not lower than 0.034 W/mK.

5) Combustibility

Using specimens each having a thickness of 10 mm, a length of 200 mm and a width of 25 mm taken from foams 14 days after the production, a combustion test was carried out with n=5 according to JIS A 9511 and the combustibility was evaluated according to the following evaluation criteria.

◎: The flame extinguishing time is within 3 seconds for all of 5 specimens.

○: Although the flame extinguishing time for the resin is within 3 seconds for all of 5 specimens, some combustion of the blowing agent is observed.

Δ: Although the flame extinguishing time for the resin is within 3 seconds for all of 5 specimens, combustion of the blowing agent is observed over the entire specimen.

X: The flame extinguishing time is longer than 3 seconds.

Example F1

To 100 parts of a polystyrene resin (produced by Nippon Steel Chemical Co., Ltd., Estyrene G-17, melt index (MI): 3.1), 0.5 part of talc as a nucleating agent, 3.0 parts of hexabromocyclododecane (HBCD) as a halogenated flame retardant and 2.0 parts of diboron trioxide (produced by US BORAX Co., Boric Oxide), and further 0.25 part of barium stearate were dry-blended and then the resultant resin mixture was supplied at a rate of about 40 kg/hr to a two-stage extruder composed of a 65 mm diameter extruder and a 90 mm diameter extruder connected in series.

The resin mixture supplied to the foregoing 65 mm diameter extruder was heated to 200° C. to be melted, plasticized and kneaded, and then the resultant was cooled to 120° C. in the 90 mm diameter extruder connected to the former and extruded to the atmospheric air through a die with a rectangular cross section of 2 mm in the thickness direction and 50 mm in the width direction attached to the tip of the 90 mm diameter extruder to obtain an extruded foam having a rectangular parallelepiped shape.

In this case, as blowing agents, isobutane and methyl chloride were introduced under pressure into the polystyrene resin so that the total amount of isobutane and methyl chloride was 8 parts based on 100 parts of the polystyrene resin and the proportions of isobutane and methyl chloride were 50% by weight and 50% by weight, respectively, based on 100% by weight of the total of the blowing agents, through different lines, respectively, at the tip portion of the foregoing 65 mm diameter extruder (the end portion to which the 90 mm diameter extruder was connected at the end opposite to the die of the extruder). The characteristic properties of the obtained foam are shown in Table F1.

Examples F2 to F4

Extruded foams were obtained in the same conditions as in Example F1 except that the amount of diboron trioxide and the amounts of the respective blowing agents were changed to those described in Table F1. The characteristic properties of the obtained foams are shown in Table F.

Example F5

An extruded foam was obtained in the same conditions as in Example F1 except that tetrabromobisphenol A type epoxy oligomer was used in place of HBCD. The characteristic properties of the obtained foam are shown in Table F.

Example F6

An extruded foam was obtained in the same conditions as in Example F1 except that decabromodiphenylethane was used in place of HBCD. The characteristic properties of the obtained foam are shown in Table F.

Comparative Example F1

An extruded foam was obtained in the same conditions as in Example F1 except that none of HBCD and diboron trioxide were added. The characteristic properties of the obtained foam are shown in Table F.

Comparative Example F2

An extruded foam was obtained in the same conditions as in Example F1 except that no diboron trioxide was added. The characteristic properties of the obtained foam are shown in Table F.

Comparative Example F3

An extruded foam was obtained in the same conditions as in Example F3 except that no HBCD was added. The characteristic properties of the obtained foam are shown in Table F.

TABLE F

|  |  | Example Comparative |  |  |  |  |  | Example |  |  |
|---|---|---|---|---|---|---|---|---|---|---|
|  |  | F1 | F2 | F3 | F4 | F5 | F6 | F1 | F2 | F3 |
| Polystyrene | Parts | 100 | 100 | 100 | 100 | 100 | 100 | 100 | 100 | 100 |
| Halogenated flame retardant |  |  |  |  |  |  |  |  |  |  |
| HBCD | Parts | 3 | 3 | 3 | 3 | — | — | — | 3 | — |
| Tetrabromobisphenol A type epoxy oligomer | Parts | — | — | — | — | 3 | — | — | — | — |
| Decabromodiphenylethane | Parts | — | — | — | — | — | 3 | — | — | — |
| Diboron trioxide | Parts | 2 | 5 | 5 | 1 | 2 | 2 | — | — | 2 |
| Blowing agent |  |  |  |  |  |  |  |  |  |  |
| Isobutane | Parts | 4 | 6 | 4 | 3 | 4 | 4 | 4 | 4 | 4 |
| Methyl choride | Parts | 4 | 3 | 5 | 5 | 4 | 4 | 4 | 4 | 4 |
| Expansion ratio | Times | 36 | 34 | 40 | 33 | 35 | 35 | 37 | 36 | 35 |
| Closed cell ratio | % | 97 | 95 | 98 | 99 | 96 | 96 | 98 | 96 | 97 |
| Amount of remaining blowing agent |  |  |  |  |  |  |  |  |  |  |
| Isobutane | g | 3.8 | 5.5 | 3.8 | 2.6 | 3.7 | 3.8 | 3.8 | 3.7 | 3.8 |
| Thermal conductivity |  | ○ | ○ | ○ | ○ | ○ | ○ | ○ | ○ | ○ |
| Combustibility |  | ⊚ | ⊚ | ⊚ | ⊚ | ⊚ | ⊚ | X | Δ | X |

As being made clear by comparison of Examples F1 to F6 with Comparative Examples F1 to F3, the foams of the present invention obtained by using isobutane as one of saturated hydrocarbons having 3 to 5 carbon atoms, methyl chloride as other blowing agent, HBCD or the like as a halogenated flame retardant, and boron oxide as a flame retardant B were found excellent in the thermal conductivity and flame retardant property.

Examples G1 to G9 and Comparative Examples G1, G2

As the characteristic properties of each foam obtained by Examples G1 to G9 and Comparative Examples G1, G2 described below, 1) the expansion ratio, 2) the closed cell ratio, 3) the amount of remaining blowing agent amount, 4) the thermal conductivity, 5) the combustibility, and 6) the small cell occupying area ratio [the surface area of cells with 0.25 mm or smaller cell size (herein, the cell with a cell size of 0.25 mm or smaller means that the diameter of a circle having the same area as the sectional area of the cell is 0.25 mm or smaller] were determined according to the following methods.

1) Expansion Ratio

An approximate density of styrene resin was assumed to be 1.05 (g/cm³) and the expansion ratio was calculated by the following equation:

Expansion ratio (times)=1.05/(foam density) (g/cm³)

2) Closed Cell Ratio

Using a multi-pycnometer (manufactured by Beckman Japan Co., Ltd.), the closed cell ratio was measured according to ASTM D-2856.

3) Amount of Remaining Blowing Agent

Fourteen days after the production, a foam was analyzed using a gas chromatograph (GC-14A manufactured by Shimadzu Corporation) to determine the amount (g) of remaining blowing agent based on 100 g of the foam.

4) Thermal Conductivity

The thermal conductivity of a foam was measured according to JIS A 9511. The measurement was carried out for foams 14 days after the production.

5) Combustibility

Using specimens each having a thickness of 10 mm, a length of 200 mm and a width of 25 mm taken from foams 14 days after the production, a combustion test was carried out with n=5 according to JIS A 9511 and the combustibility was evaluated according to the following evaluation criteria.

⊚: The flame extinguishing time is within 3 seconds for all of 5 specimens.

○: Although the flame extinguishing time for the resin is within 3 seconds for all of 5 specimens, some combustion of the blowing agent is observed.

Δ: Although the flame extinguishing time for the resin is within 3 seconds for all of 5 specimens, combustion of the blowing agent is observed over the entire specimen.

X: The flame extinguishing time is longer than 3 seconds.

6) Small Cell Occupying Area Ratio a) A longitudinal section of a foam is photographed at ×30 magnification by using a scanning electron microscope (manufactured by Hitachi Ltd., model S-450).

b) On the photograph is placed an OHP sheet onto which are copied the parts corresponding to cells having a cell size in the thickness direction of more than 7.5 mm (which corresponds to cells having an actual cell size of more than 0.25 mm) by filling them with a black ink (a first treatment).

c) The image subjected to the first treatment is read by an image processing apparatus (manufactured by PIAS Co., Ltd., model: PIAS-II) and the deep color parts and the light color part, namely, whether a certain part is colored in black or not, are distinguished.

d) Among the deep color parts, parts corresponding to an area of a circle having a diameter of not more than 7.5 mm, namely, parts which have a long diameter in the thickness direction but have only an area not more than that of a circle having a diameter of 7.5 mm are changed to light color, whereby the deep color parts are corrected.

e) The area ratio of parts having a cell size of not more than 7.5 mm (light color parts) to the whole image is determined according to the following formula using "FRACTAREA (area ratio)" which is one of image analysis calculating functions.

Small cell occupying area ratio (%)=(1-area of deep color parts/area of the whole image)×100

Example G1

1) Surface Treatment of Boron Oxide

A Henshell mixer (Super Mixer SMG-20, manufactured by Kawada Manufacturing Co., Ltd.) was loaded with 3,000 g of diboron trioxide (produced by US Borax Co., Boric Oxide), and while mixing with stirring 388 g of a melamine resin (Bansemin SM-960, produced by Harima Chemicals, Inc., grade with a non-volatile content of 61.9%) was added for 5 minutes and thereafter, mixing with stirring was further continued for 10 minutes. After mixing, the resultant was taken out and spread on a butt made of aluminum so that particles do not come into contact with each other as much as possible and then cured by heating at 150° C. for 30 minutes to obtain diboron trioxide surface-treated with the melamine resin.

2) Foam Production

To 100 parts of a polystyrene resin(produced by Nippon Steel Chemical Co., Ltd., Estyrene G-17, melt index (MI): 3.1), 0.5 part of talc as a nucleating agent, 3.0 parts of hexabromocyclododecane (HBCD) as a halogenated flame retardant and 2.0 parts of the diboron trioxide surface-treated with the melamine resin., 0.25 part of barium stearate, and 1 part of bentonite were dry-blended and then the resultant resin mixture was supplied at a rate of about 40 kg/hr to a two-stage extruder composed of a 65 mm diameter extruder and a 90 mm diameter extruder connected in series. The resin mixture supplied to the foregoing 65 mm diameter extruder was heated to 200° C. to be melted, plasticized and kneaded, and then the resultant was cooled to 120° C. in the 90 mm diameter extruder connected to the former and extruded to the atmospheric air through a die with a rectangular cross section of 2 mm in the thickness direction and 50 mm in the width direction attached to the tip of the 90 mm diameter extruder to obtain an extruded foam having a rectangular parallelepiped shape.

In this case, as blowing agents, 4.5 parts of isobutane and 0.7 part of water based on 100 parts of the polystyrene resin were introduced under pressure into the resin through different lines, respectively, at the tip portion of the foregoing 65 mm diameter extruder (the end portion to which the 90 mm diameter extruder was connected at the end opposite to the die of the extruder). The characteristic properties of the obtained foam are shown in Table G1.

Example G2

An extruded foam was obtained in the same conditions as in Example G1 except that the amount of the diboron trioxide surface-treated with the melamine resin was changed to 5.0 parts. The characteristic properties of the obtained foam are shown in Table G1.

Example G3

In the surface treatment of boron oxide, a diboron trioxide surface-treated with phenol resin was produced in the same conditions as in Example G1 except that 255 g of phenol resin (Phenolite ST-611-LV, produced by Dainippon Ink and Chemicals, Inc., content of effective component: 70%) was used in place of the melamine resin, and in the production of the foam, an extruded foam was obtained in the same conditions as in Example G1 except that the diboron trioxide surface-treated with the phenol resin was used. The characteristic properties of the obtained foam are shown in Table G1.

Example G4

1) Surface Treatment of Boron Oxide

A Henshell mixer (Super Mixer SMG-20, manufactured by Kawada Manufacturing Co., Ltd.) was loaded with 3,000 g of diboron trioxide (Boric Oxide, produced by US Borax Co.), and while mixing with stirring 120 g of γ-methacryloyloxypropyltrimethoxysilane (TSL8370, produced by Toshiba Silicone Co., Ltd.) was added for 5 minutes and thereafter, mixing with was further continued for 10 minutes to conduct a surface treatment of diboron trioxide.

2) Foam Production

An extruded foam was obtained in the same conditions as in the foam production of Example G1 except that the diboron trioxide surface-treated with y-methacryloyloxypropyltrimethoxysilane was used in place of the diboron trioxide surface-treated with the melamine resin. The characteristic properties of the obtained foam are shown in Table G1.

Example G5

An extruded foam was obtained in the same conditions as in Example G1 except that 4.5 parts of isobutane, 1.5 parts of dimethyl ether and 0.7 part of water based on 100 parts of the polystyrene resin were used as the blowing agents. The characteristic properties of the obtained foam are shown in Table G1.

Example G6

An extruded foam was obtained in the same conditions as in Example G1 except that tetrabromobisphenol A type epoxy oligomer was used in place of HBCD. The characteristic properties of the obtained foam are shown in Table G1.

Example G7

An extruded foam was obtained in the same conditions as in Example G1 except that decabromodiphenylethane was used in place of HBCD. The characteristic properties of the obtained foam are shown in Table G1.

Example G8

An extruded foam was obtained in the same conditions as in Example G1 except that diboron trioxide was used without surface treatment. The characteristic properties of the obtained foam are shown in Table G1.

Example G9

An extruded foam was obtained in the same conditions as in Example G1 except that water as a blowing agent was not used. The characteristic properties of the obtained foam are shown in Table G1.

Comparative Example G1

An extruded foam was obtained in the same conditions as in Example G1 except that diboron trioxide was not added. The characteristic properties of the obtained foam are shown in Table G2.

Comparative Example G2

An extruded foam was obtained in the same conditions as in Example G1 except that HBCD was not added. The characteristic properties of the obtained foam are shown in Table G2.

TABLE G1

|  | Example | | | | | | | | |
| --- | --- | --- | --- | --- | --- | --- | --- | --- | --- |
|  | G1 | G2 | G3 | G4 | G5 | G6 | G7 | G8 | G9 |
| Polystyrene (parts) | 100 | 100 | 100 | 100 | 100 | 100 | 100 | 100 | 100 |
| Halogenated flame retardant | | | | | | | | | |
| HBCD (parts) | 3 | 3 | 3 | 3 | 3 | — | — | 3 | 3 |
| Tetrabromobisphenol A type epoxy oligomer (parts) | — | — | — | — | — | 3 | — | — | — |
| Decabromodiphenylethane (parts) | — | — | — | — | — | — | 3 | — | — |
| Diboron trioxide (parts) | 2 (Melamine treatment) | 5 (Melamine treatment) | 2 (Melamine treatment) | 2 (γ-methacryloyloxy-propyl-trimethoxysilane treatment) | 2 (Melamine treatment) | 2 (Melamine treatment) | 2 (Melamine treatment) | 2 (No surface treatment) | 2 (Melamine treatment) |
| Talc (parts) | 0.5 | 0.5 | 0.5 | 0.5 | 0.5 | 0.5 | 0.5 | 0.5 | 0.5 |
| Barium stearate (parts) | 0.25 | 0.25 | 0.25 | 0.25 | 0.25 | 0.25 | 0.25 | 0.25 | 0.25 |
| Bentonite(parts) | 1 | 1 | 1 | 1 | 1 | 1 | 1 | 1 | 1 |
| Blowing agent | | | | | | | | | |
| Isobutane (parts) | 4.5 | 4.5 | 4.5 | 4.5 | 4.5 | 4.5 | 4.5 | 4.5 | 4.5 |
| Dimethyl ether (parts) | — | — | — | — | 1.5 | — | — | — | — |
| Water (parts) | 0.7 | 0.7 | 0.7 | 0.7 | 0.7 | 0.7 | 0.7 | 0.7 | — |
| Expansion ratio (times) | 27 | 26 | 28 | 26 | 34 | 26 | 27 | 27 | 29 |
| Closed cell ratio (%) | 95 | 94 | 95 | 95 | 95 | 95 | 95 | 96 | 96 |
| Amount of remaining blowing agent | | | | | | | | | |
| Isobutane (g) | 4.1 | 4.0 | 4.1 | 4.0 | 4.0 | 4.0 | 4.0 | 4.1 | 4.0 |
| Dimethyl ether (g) | — | — | — | — | 0.1 | — | — | — | — |
| Thermal conductivity (W/mK) | 0.028 | 0.028 | 0.028 | 0.028 | 0.028 | 0.028 | 0.028 | 0.031 | 0.029 |
| Combustibility | ◎ | ◎ | ◎ | ◎ | ◎ | ◎ | ◎ | ○ | ◎ |
| Small cell occupying area ratio (%) | 30 | 29 | 30 | 28 | 30 | 29 | 30 | 6 | 0 |

TABLE G2

|  | Comparative Example | |
| --- | --- | --- |
|  | G1 | G2 |
| Polystyrene (parts) | 100 | 100 |
| Halogenated flame retardant | | |
| HBCD (parts) | 3 | — |
| Diboron trioxide (parts) | — | 2 (Melamine treatment) |
| Talc (parts) | 0.5 | 0.5 |
| Barium stearate (parts) | 0.25 | 0.25 |
| Bentonite (parts) | 1 | 1 |
| Blowing agent | | |
| Isobutane (parts) | 4.5 | 4.5 |
| Water (parts) | 0.7 | 0.7 |
| Expansion ratio (times) | 27 | 29 |
| Closed cell ratio (%) | 95 | 96 |
| Amount of remaining blowing agent | | |
| Isobutane (g) | 4.1 | 4.0 |
| Thermal conductivity (W/mK) | 0.028 | 0.028 |
| Combustibility | Δ | X |
| Small cell occupying area ratio (%) | 40 | 38 |

As being made clear by comparison of Examples G1 to G7 with Comparative Examples G1, G2, the foams of the present invention obtained by using isobutane as one of saturated hydrocarbons having 3 to 5 carbon atoms, water as other blowing agent (in Example G5, dimethyl ether was further used as other blowing agent), HBCD or the like as a halogenated flame retardant, and surface-treated boron oxide as a flame retardant B were found to be foams containing small cells and large cells together and excellent in the thermal conductivity and flame retardant property.

According to the present invention, an extruded styrene resin foam excellent in environmental compatibility and having excellent flame retardant property and thermal insulation property can be stably produced.

What is claimed is:

1. An extruded styrene resin foam containing no flon type blowing agent and having both thermal insulating property and flame retardant property meeting thermal insulating board No. 3 of extruded polystyrene foam prescribed in JIS A 9511.

2. The extruded styrene resin foam of claim 1, wherein the thermal insulating property is 0.028 W/mK or lower in terms of thermal conductivity.

3. The extruded styrene resin foam of claim 1 or 2, wherein the flame retardant property meets the requirements that the flame is extinguished within 3 seconds and neither remaining ember nor spreading flame beyond the indicating line of combustion limit exists in the combustion test prescribed in JIS A 9511.

4. An extruded styrene resin foam containing no flon type blowing agent and having both thermal insulating property and flame retardant property meeting thermal insulating board No. 3 of extruded polystyrene foam prescribed in JIS A 9511, wherein said resin foam contains a blowing agent comprising 100 to 10% by weight of at least one saturated hydrocarbon having 3 to 5 carbon atoms and 0 to 90% by weight of other blowing agent, based on the total amount of the blowing agent.

5. The extruded styrene resin foam of claim 4, wherein the blowing agent comprises 100 to 30% by weight of at least one saturated hydrocarbon having 3 to 5 carbon atoms and 0 to 70% by weight of at least one ether selected from the group consisting of dimethyl ether, diethyl ether, and methyl ethyl ether, based on the total amount of the blowing agent.

6. An extruded styrene resin foam containing no flon type blowing agent and having both thermal insulating property and flame retardant property meeting thermal insulating board No. 3 of extruded polystyrene foam prescribed in JIS A 9511, wherein the blowing agent comprises at least one saturated hydrocarbon having 3 to 5 carbon atoms; at least one ether selected from the group consisting of dimethyl ether, diethyl ether, and methyl ethyl ether; and water, and further contains a montmorillonite type material.

7. The extruded styrene resin foam of claim 6, wherein the montmorillonite type mineral is bentonite.

* * * * *